United States Patent
Sato et al.

(10) Patent No.: US 7,020,650 B2
(45) Date of Patent: Mar. 28, 2006

(54) INFORMATION PROCESSING SYSTEM FOR E-MAIL, INFORMATION PROCESSING METHOD AND PROGRAM STORAGE MEDIUM THEREFOR

(75) Inventors: Kazumasa Sato, Tokyo (JP); Shigeru Takagi, Kanagawa (JP); Tetsuya Sekiguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 344 days.

(21) Appl. No.: 09/871,094

(22) Filed: May 31, 2001

(65) Prior Publication Data

US 2002/0184209 A1    Dec. 5, 2002

(51) Int. Cl.
  G06F 7/00    (2006.01)
  G06F 17/30   (2006.01)
  G06F 3/12    (2006.01)

(52) U.S. Cl. .................. 707/6; 707/3; 707/1; 358/1.15
(58) Field of Classification Search ............... 709/202, 709/206; 707/1, 6, 3; 358/1.15
See application file for complete search history.

(56) References Cited

U.S. PATENT DOCUMENTS

| | | | |
|---|---|---|---|
| 5,951,636 A * | 9/1999 | Zerber | 709/202 |
| 6,009,462 A * | 12/1999 | Birrell et al. | 709/206 |
| 6,018,761 A * | 1/2000 | Uomini | 709/206 |
| 6,052,442 A * | 4/2000 | Cooper et al. | 379/88.19 |
| 6,199,097 B1 * | 3/2001 | Hachiya et al. | 709/202 |
| 6,212,265 B1 * | 4/2001 | Duphorne | 379/142.15 |
| 6,389,455 B1 * | 5/2002 | Fuisz | 709/206 |
| 6,441,916 B1 * | 8/2002 | Toyoda | 358/1.15 |
| 6,556,255 B1 * | 4/2003 | Kim et al. | 348/734 |
| 2002/0107049 A1 * | 8/2002 | Maquaire et al. | 455/563 |
| 2002/0111912 A1 * | 8/2002 | Hunter et al. | 705/52 |
| 2002/0166119 A1 * | 11/2002 | Cristofalo | 725/34 |
| 2003/0120607 A1 * | 6/2003 | Piotrowski | 705/64 |
| 2003/0135555 A1 * | 7/2003 | Birrel et al. | 709/206 |
| 2004/0030744 A1 * | 2/2004 | Rubin et al. | 709/203 |

FOREIGN PATENT DOCUMENTS

JP    11149434    * 6/1999

* cited by examiner

Primary Examiner—Greta Robinson
Assistant Examiner—Kuen S. Lu
(74) Attorney, Agent, or Firm—Finnegan, Henderson, Farabow, Garrett, & Dunner, L.L.P.

(57) ABSTRACT

At the time of receiving an e-mail, a music melody correlated with a respective e-mail sender is automatically reproduced. The system and the method of the invention comprising the steps of: downloading an e-mail addressed to a respective user from a mail server; extracting a domain name from a mail address of an e-mail sender contained in the downloaded e-mail; and reproducing a music file which is registered in advance as correlated with the domain name extracted, thereby enabling the respective user to recognize who is the sender of the e-mail while downloading it from the mail server.

6 Claims, 24 Drawing Sheets

E-MAIL DELIVERY CONFIGURATION

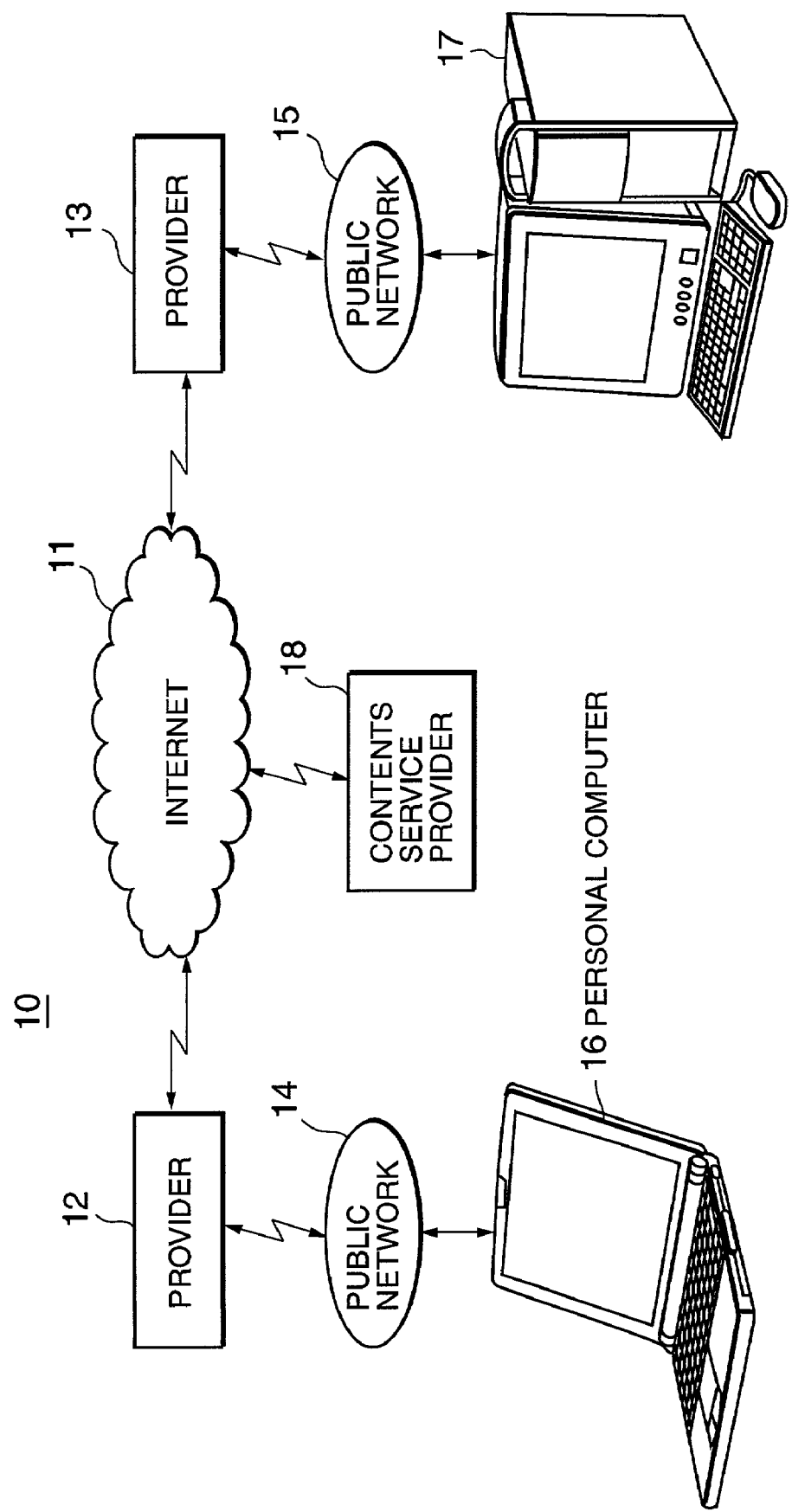
FIG. 1 COMPUTER NETWORK SYSTEM

| COMMANDS | FUNCTIONS |
|---|---|
| HELO | START SENDING BY SMTP |
| MAIL | SPECIFY SENDER'S ADDRESS |
| RCPT | SPECIFY RECEIVER'S ADDRESS |
| DATA | START SENDING OF MAIL DATA |
| QUIT | END SMTP CONNECTION |

FIG.2    BASIC COMMANDS OF SMTP

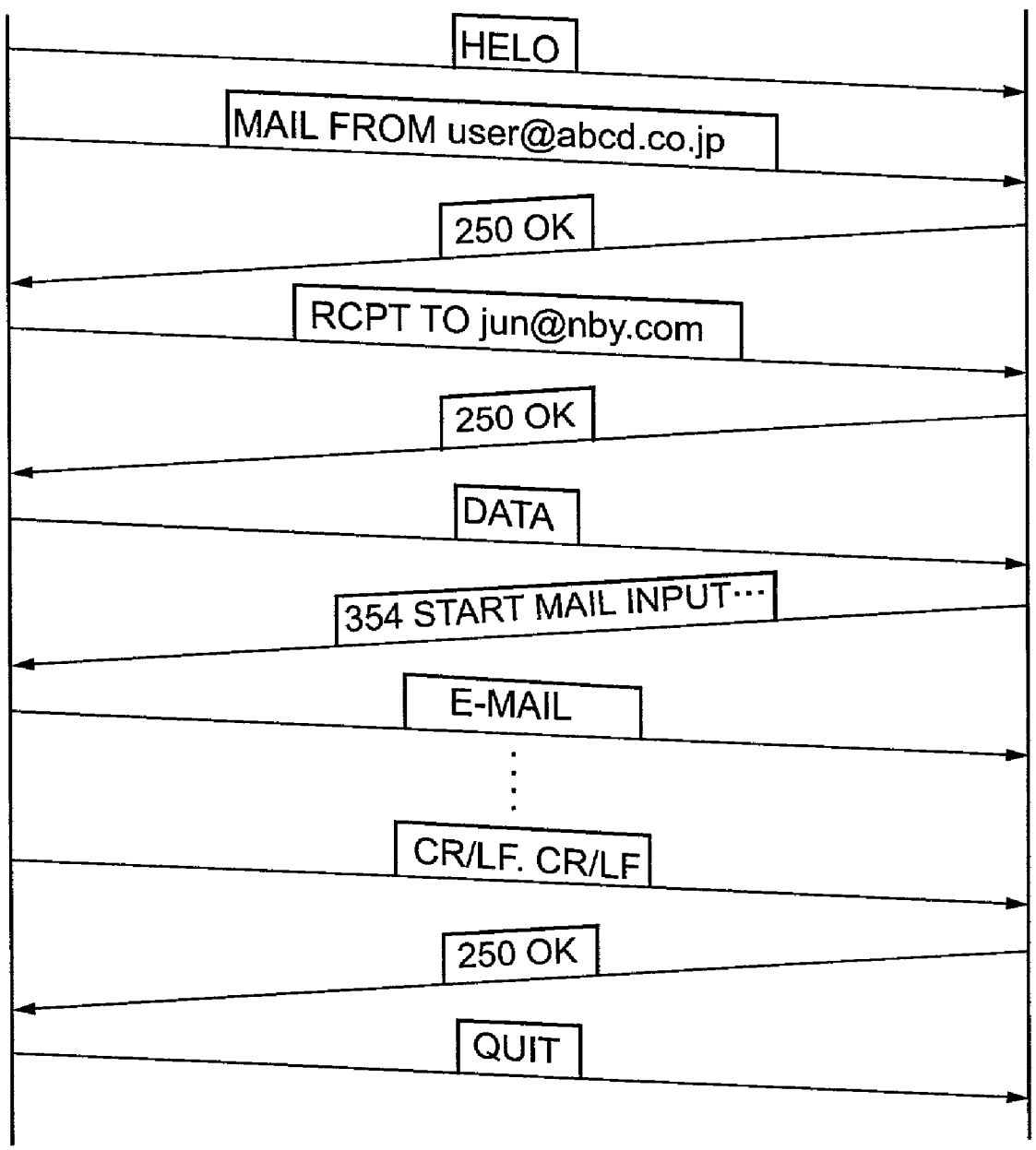
FIG.3  SEND E-MAIL BY SMTP

| COMMANDS | FUNCTIONS |
|---|---|
| USER | SPECIFY USER NAME |
| PASS | SPECIFY PASSWORD |
| LIST | MAIL NO. AND SIZE RETURNED IN RESPONSE TO INQUIRY OF MAIL LIST |
| RETR | READ A MAIL OF SPECIFIED MAIL NO. |
| DELE | DELETE THE MAIL SPECIFIED |
| QUIT | EXECUTE UPDATING OF THE MAIL BOX, THEN END COMMUNICATION OF POP 3 |

FIG.4    BASIC COMMANDS OF POP3

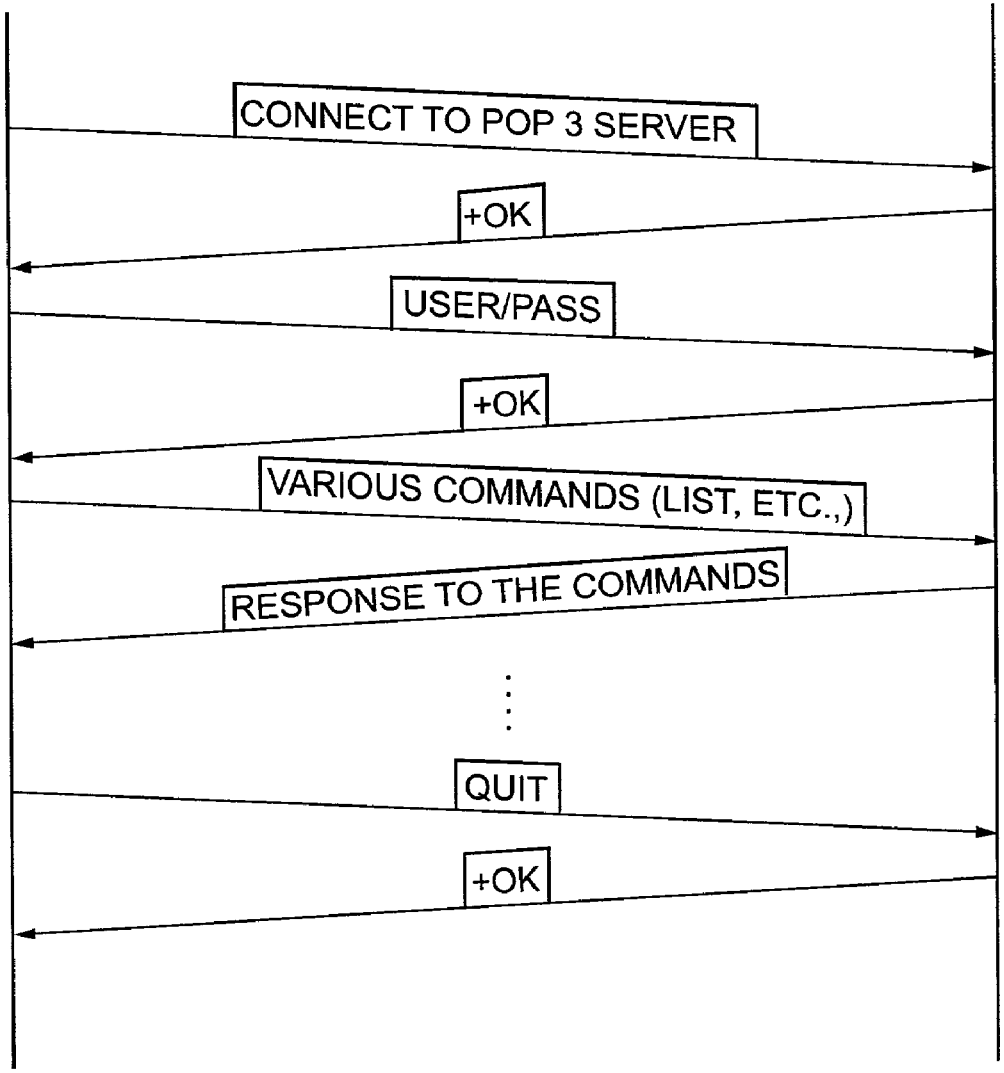
FIG.5 E-MAIL READOUT PROCEDURE BY POP 3

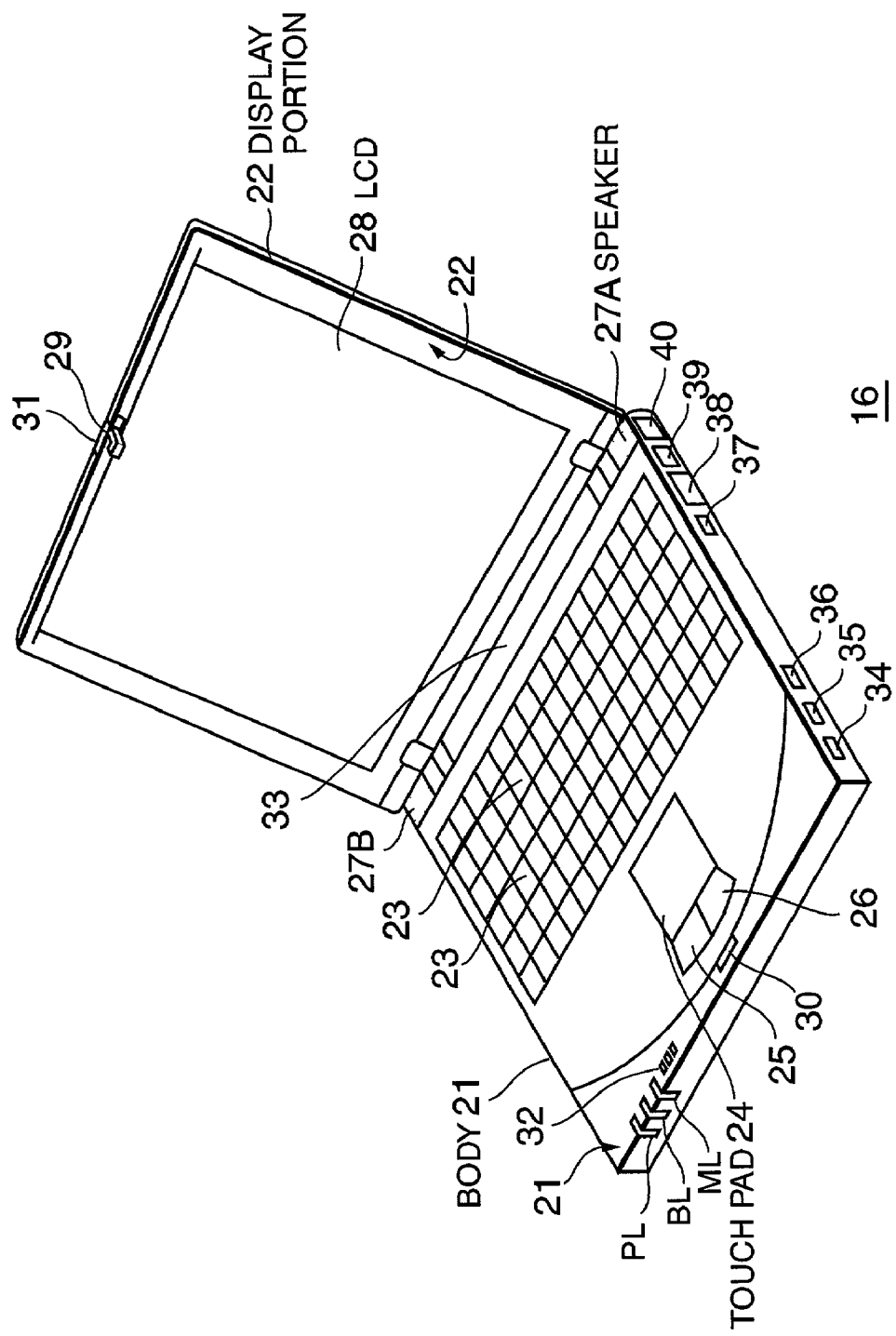
FIG.6 ARRANGEMENT OF PC

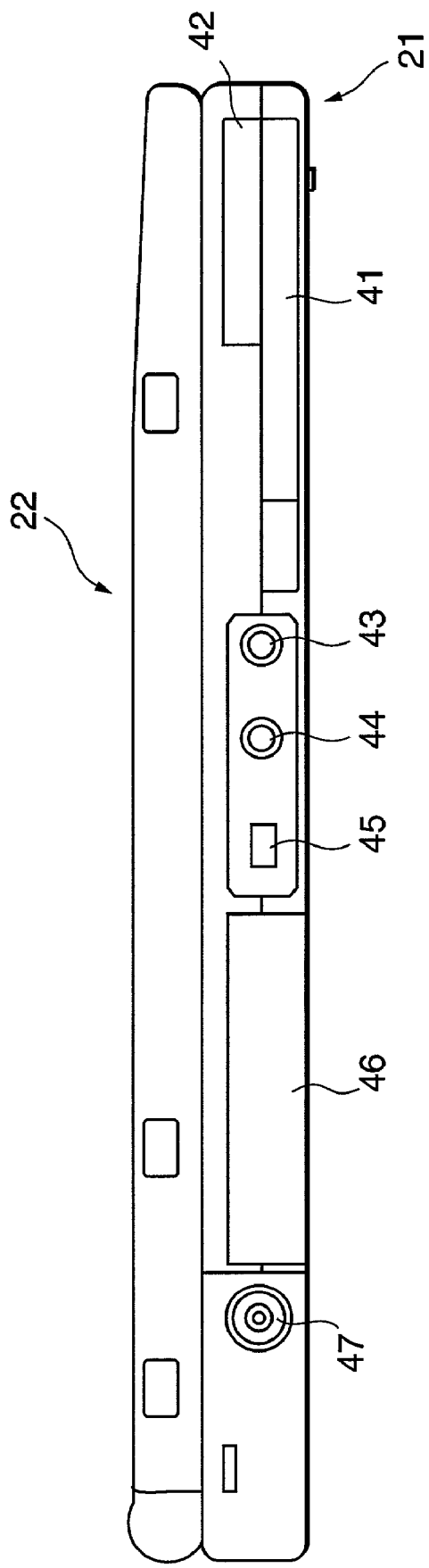
FIG. 7 LEFT-HAND SIDE ARRANGEMENT OF PC

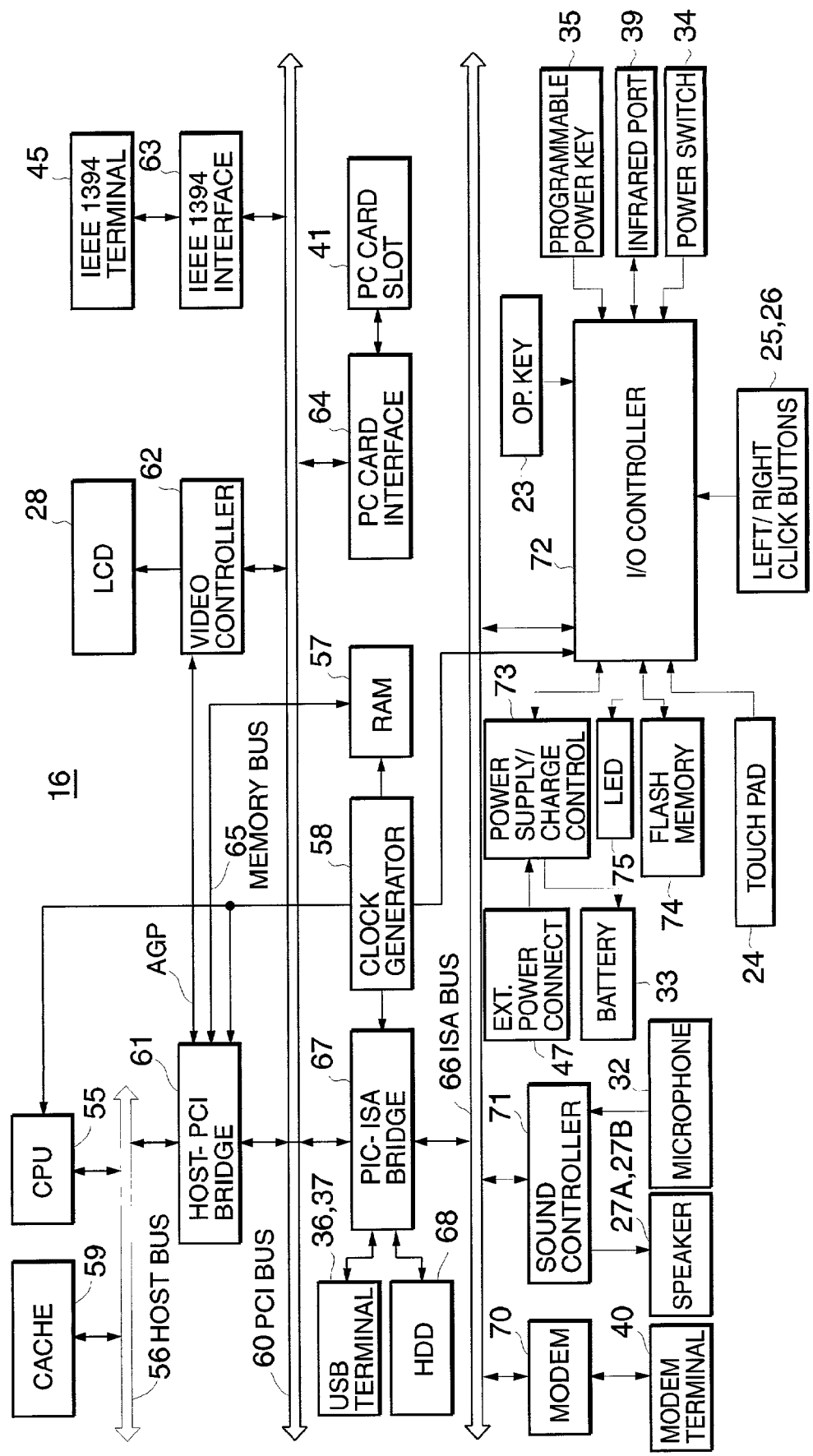
FIG. 8 CIRCUIT CONFIGURATION OF PERSONAL COMPUTER

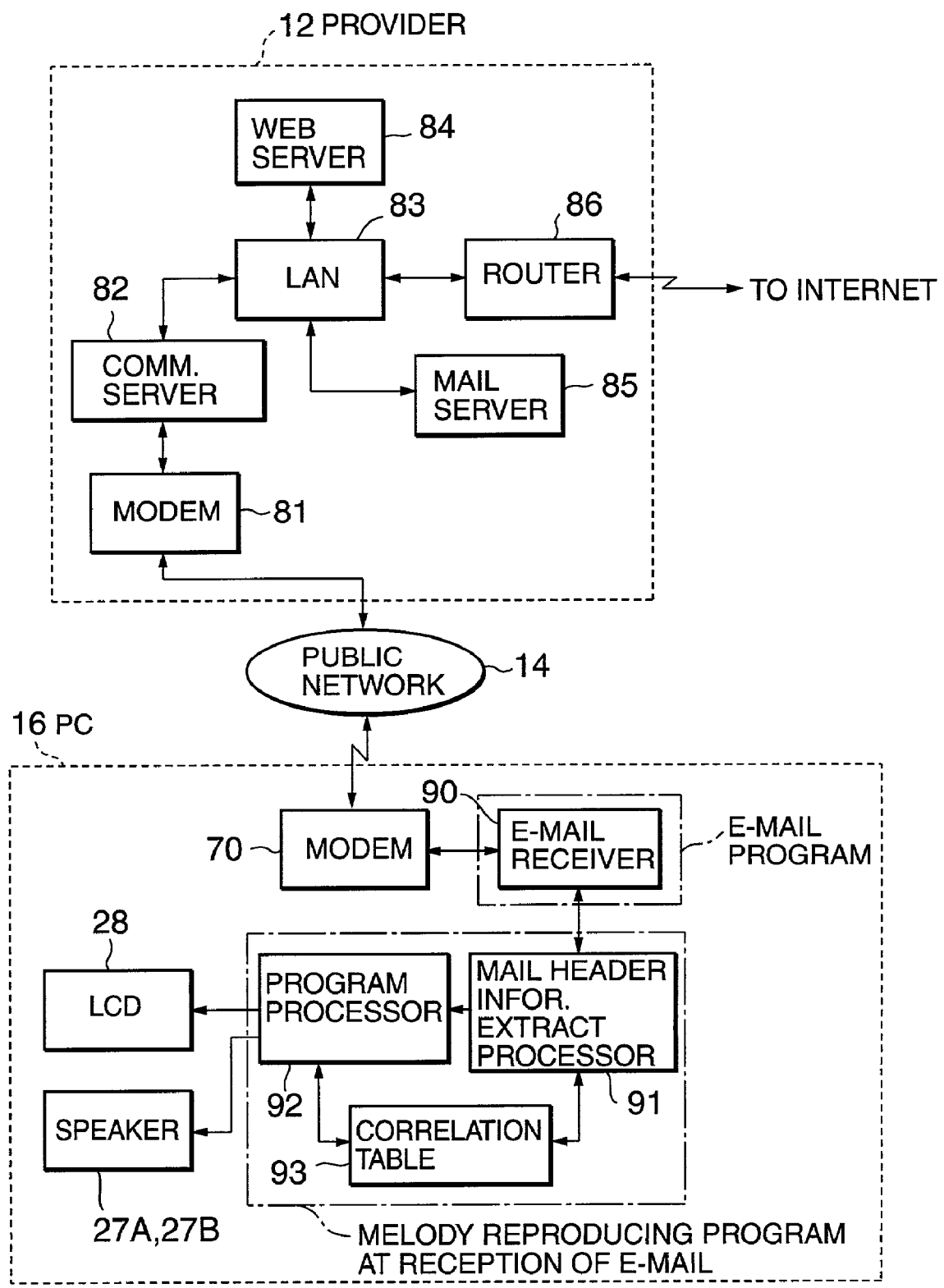
FIG.9 E-MAIL RECEIVE PROCESSING BETWEEN PROVIDER AND PC

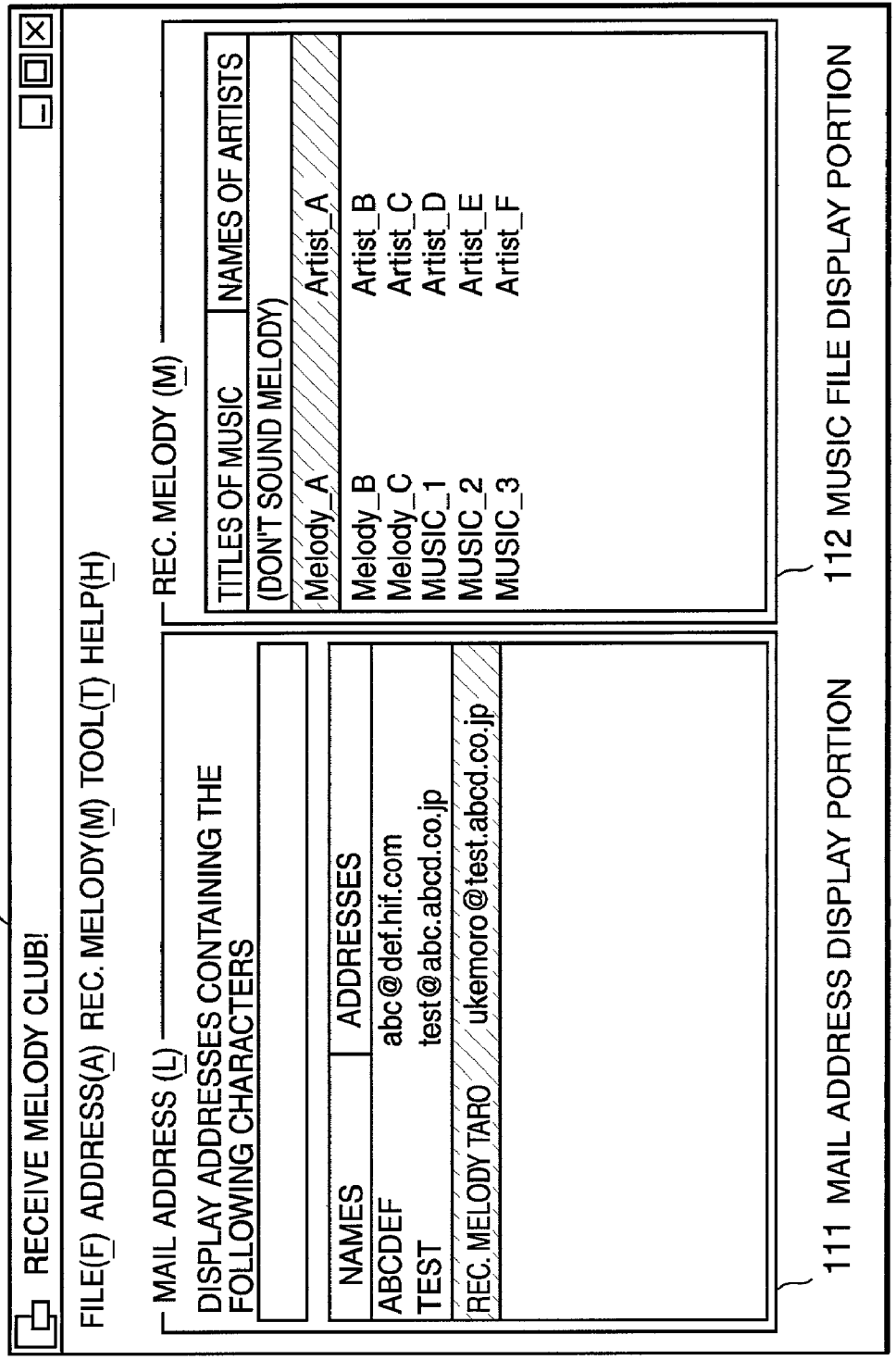
FIG. 10 SET-UP SCREEN

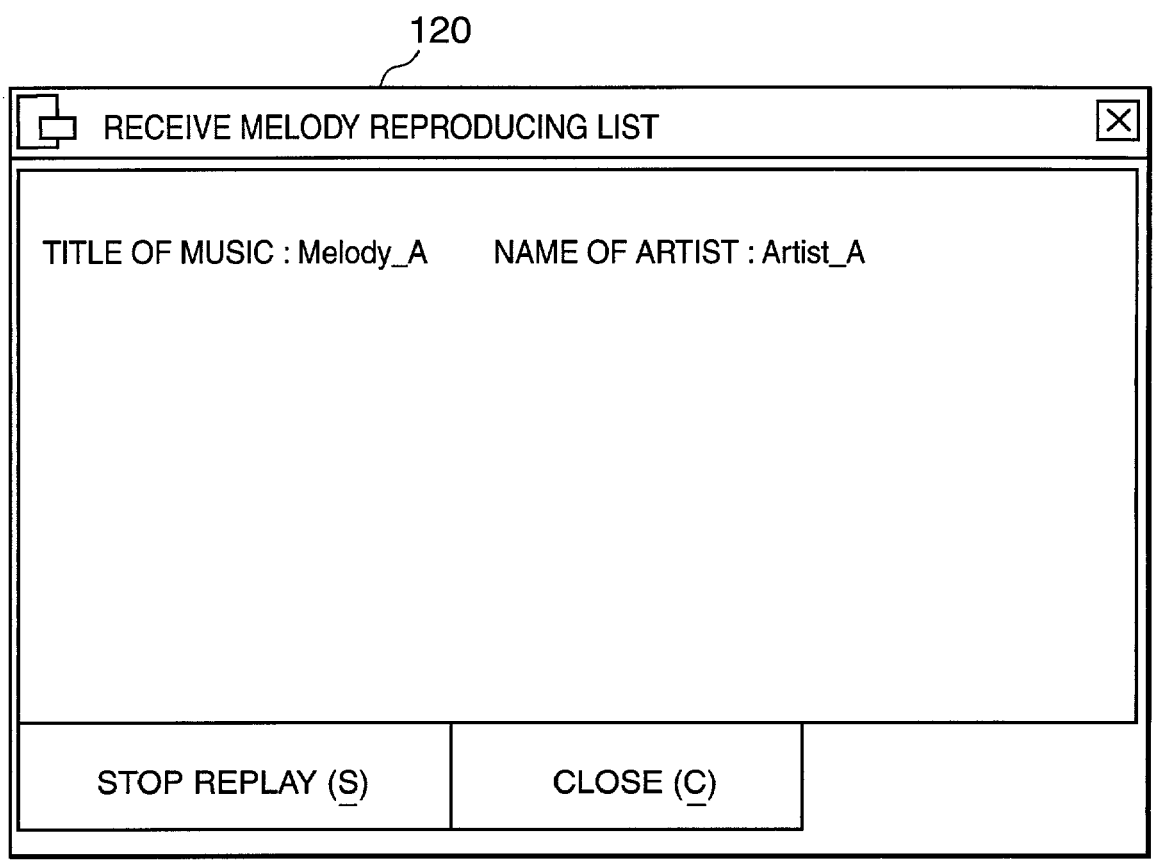
FIG.11  MUSIC TITLE DISPLAY SCREEN ON RECEIVING E-MAIL

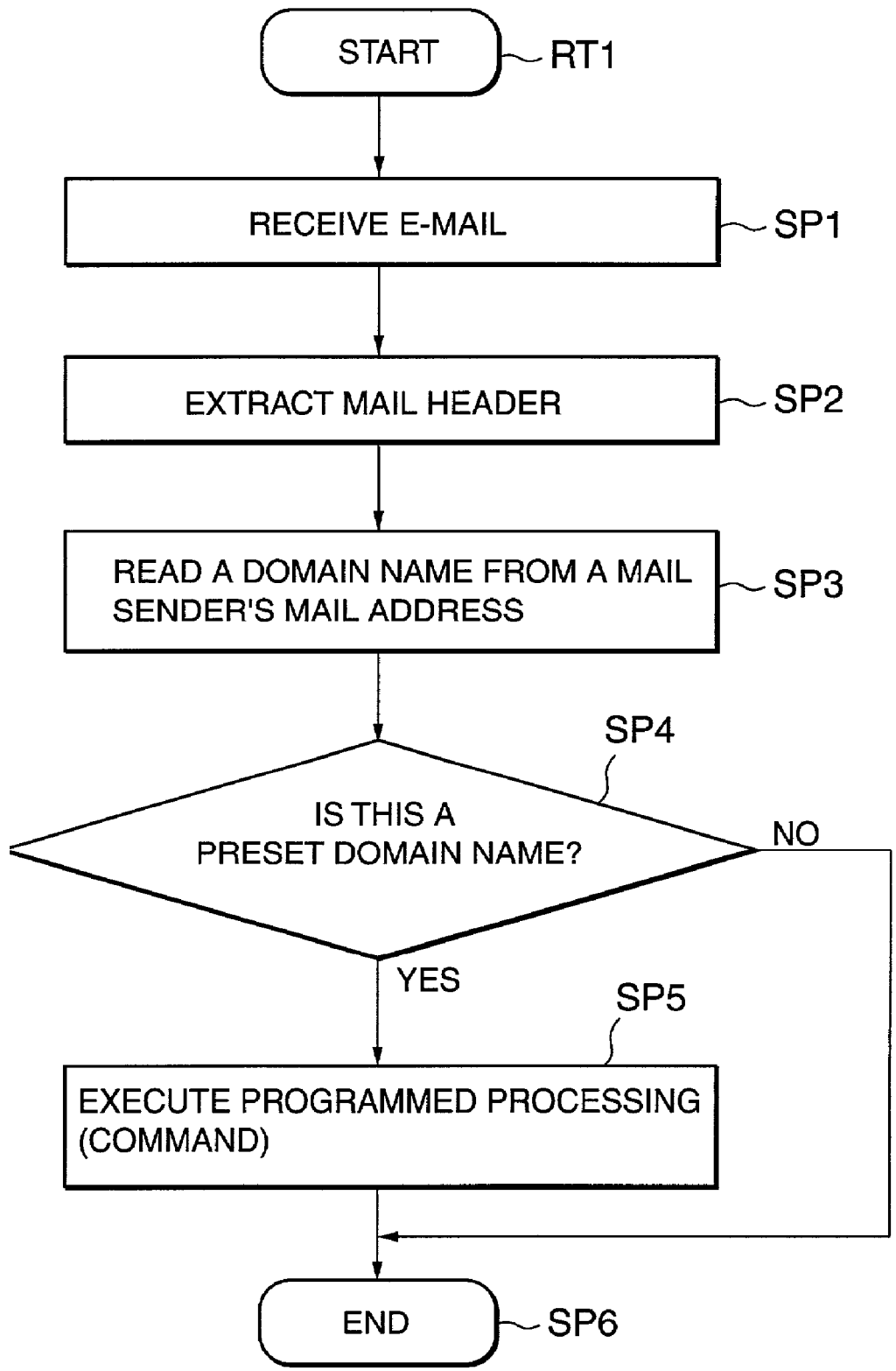
FIG.12 COMMAND EXECUTION PROCEDURE 1 ON RECEIVING E-MAIL

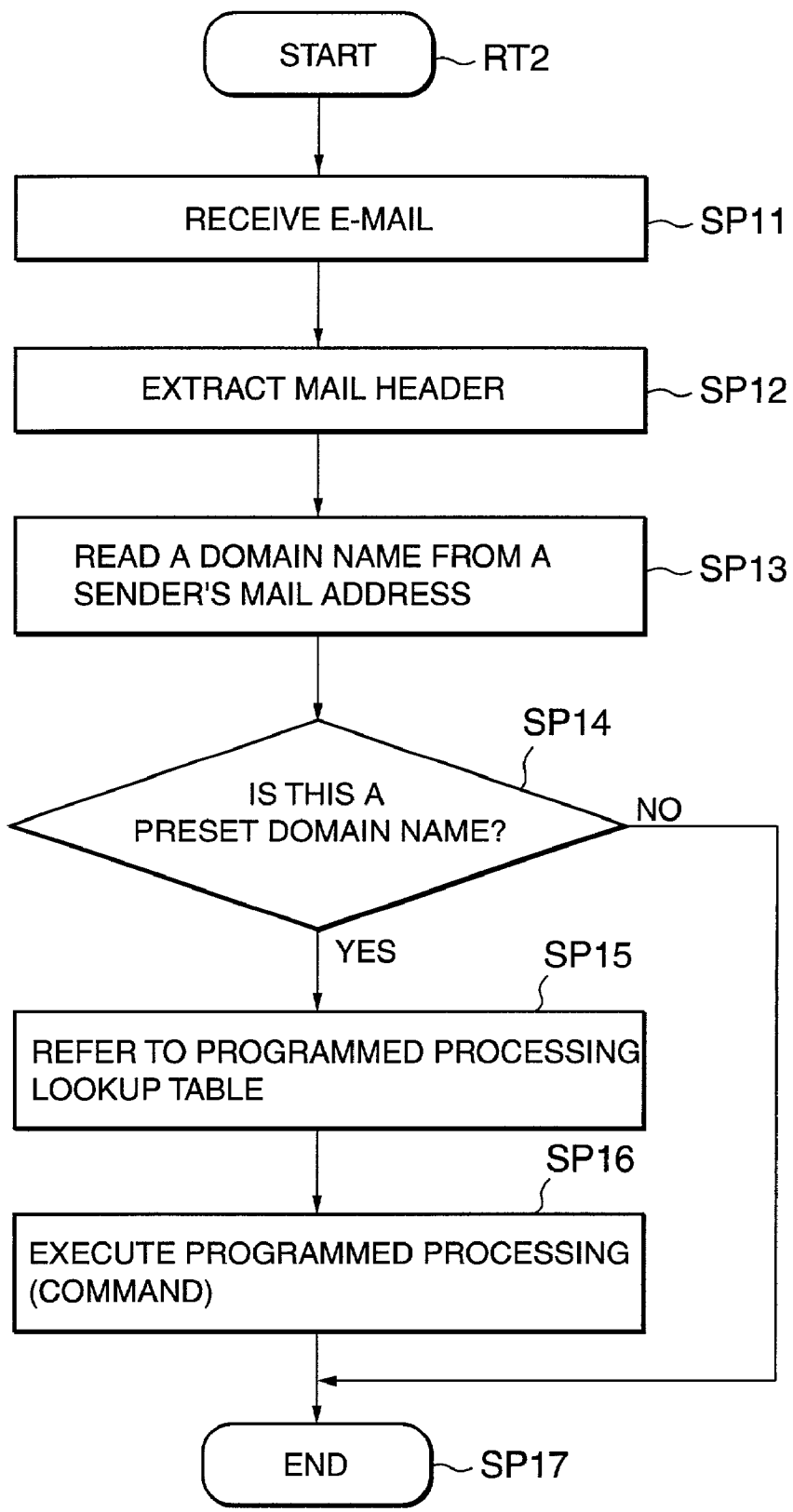
FIG.13 COMMAND EXECUTION PROCEDURE 2 ON RECEIVING E-MAIL

| DOMAIN NAMES | FILES |
|---|---|
| abcd. co. jp | File A (Melody A, Artist A) |
| efgh. co. jp | File B (Melody B, Artist B) |
| ⋮ | ⋮ |

130

FIG. 14 PROGRAMMED PROCESSING LOOKUP TABLE CORRESPONDING TO DOMAIN NAMES

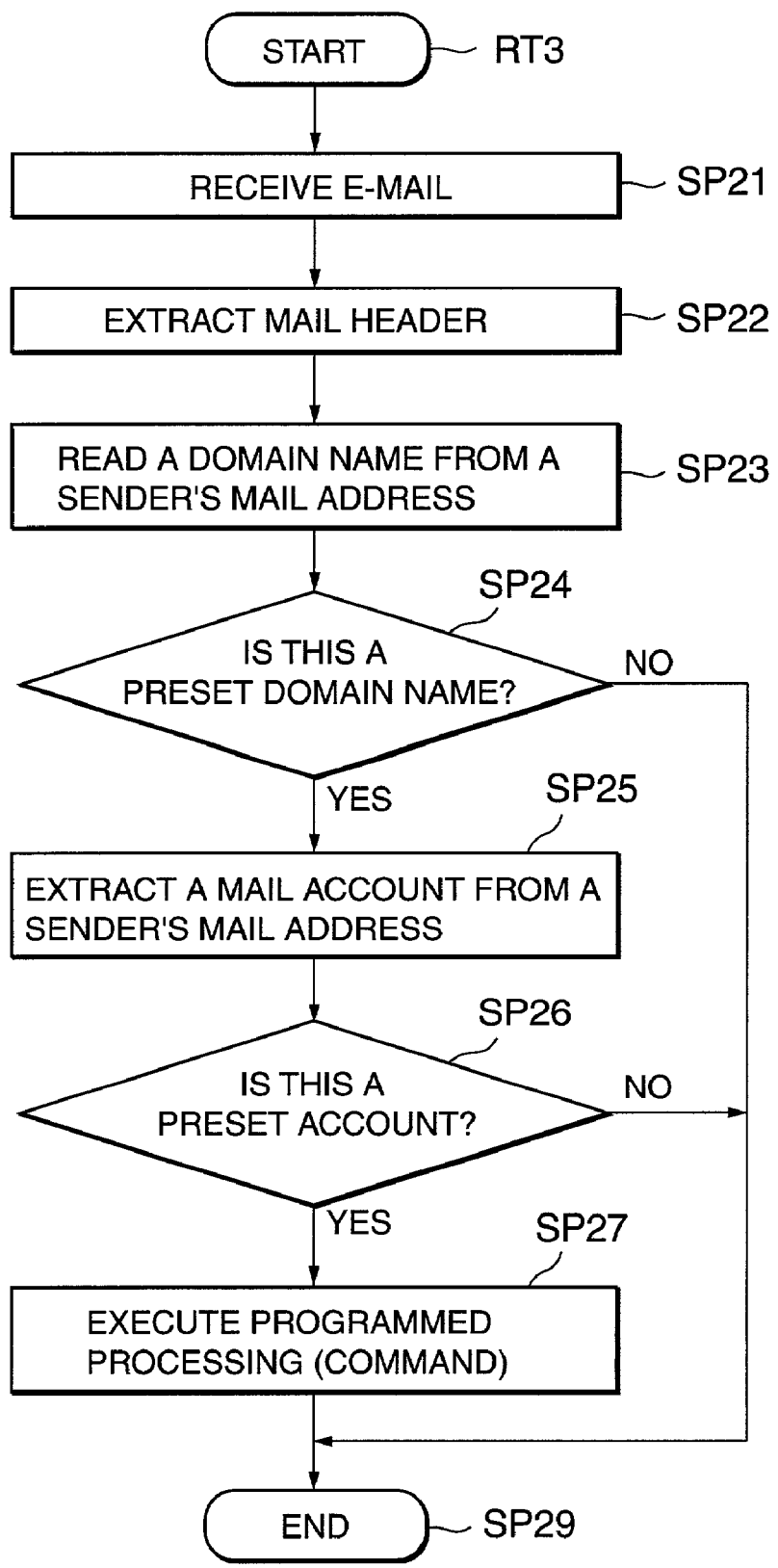
FIG.15 COMMAND EXECUTION PROCEDURE 3 ON RECEIVING E-MAIL

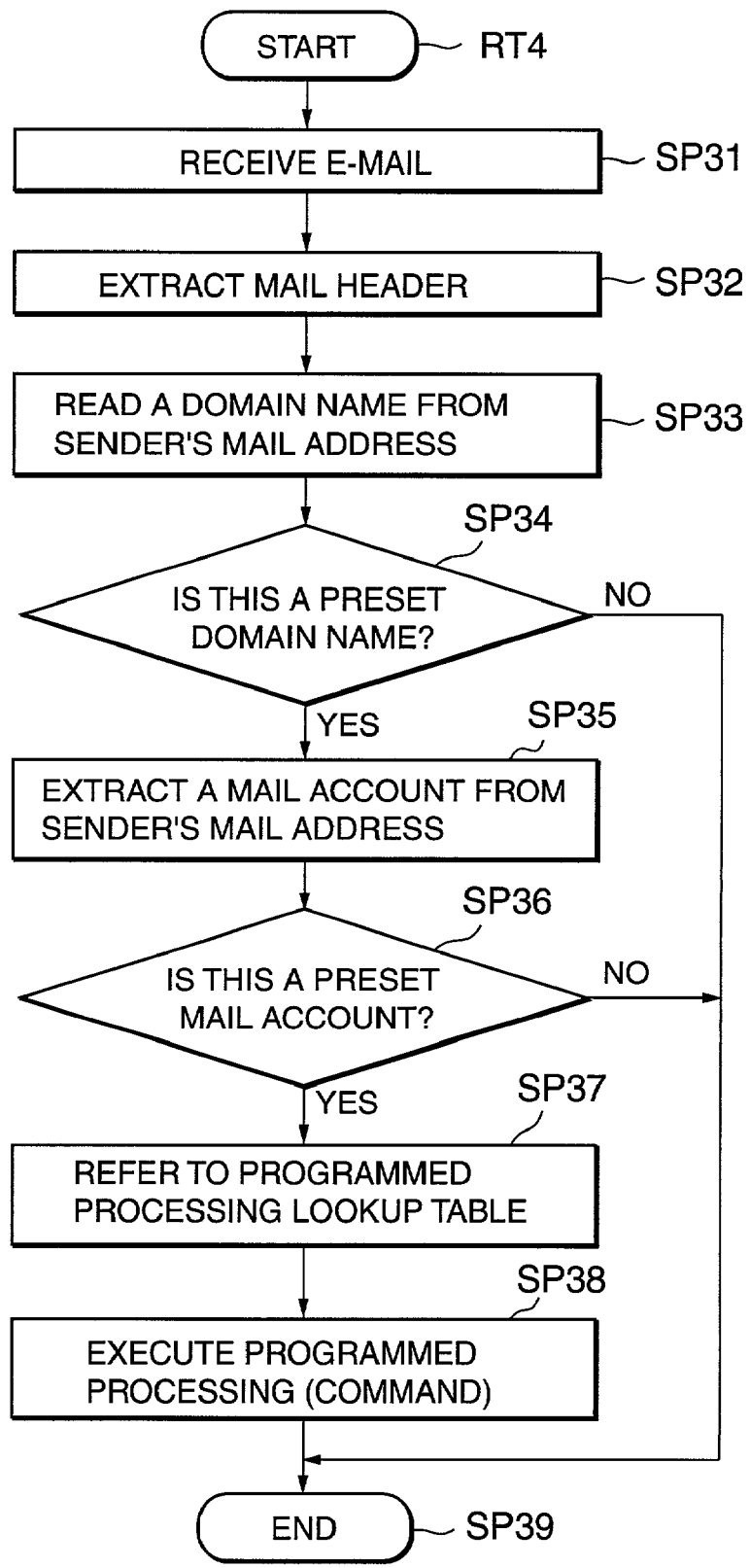
FIG.16 COMMAND EXECUTION PROCEDURE 4 ON RECEIVING E-MAIL

| MAIL ACCOUNTS | CHARACTER STRINGS |
|---|---|
| ukemero | File A (Melody A, Artist A) |
| TEST | File 1 (MUSIC 1, Artist D) |
| ABCDEF | File 3 (MUSIC 3, Artist F) |
| ⋮ | ⋮ |

140

FIG.17 PROGRAMMED PROCESSING LOOKUP TABLE CORRESPONDING TO MAIL ACCOUNTS

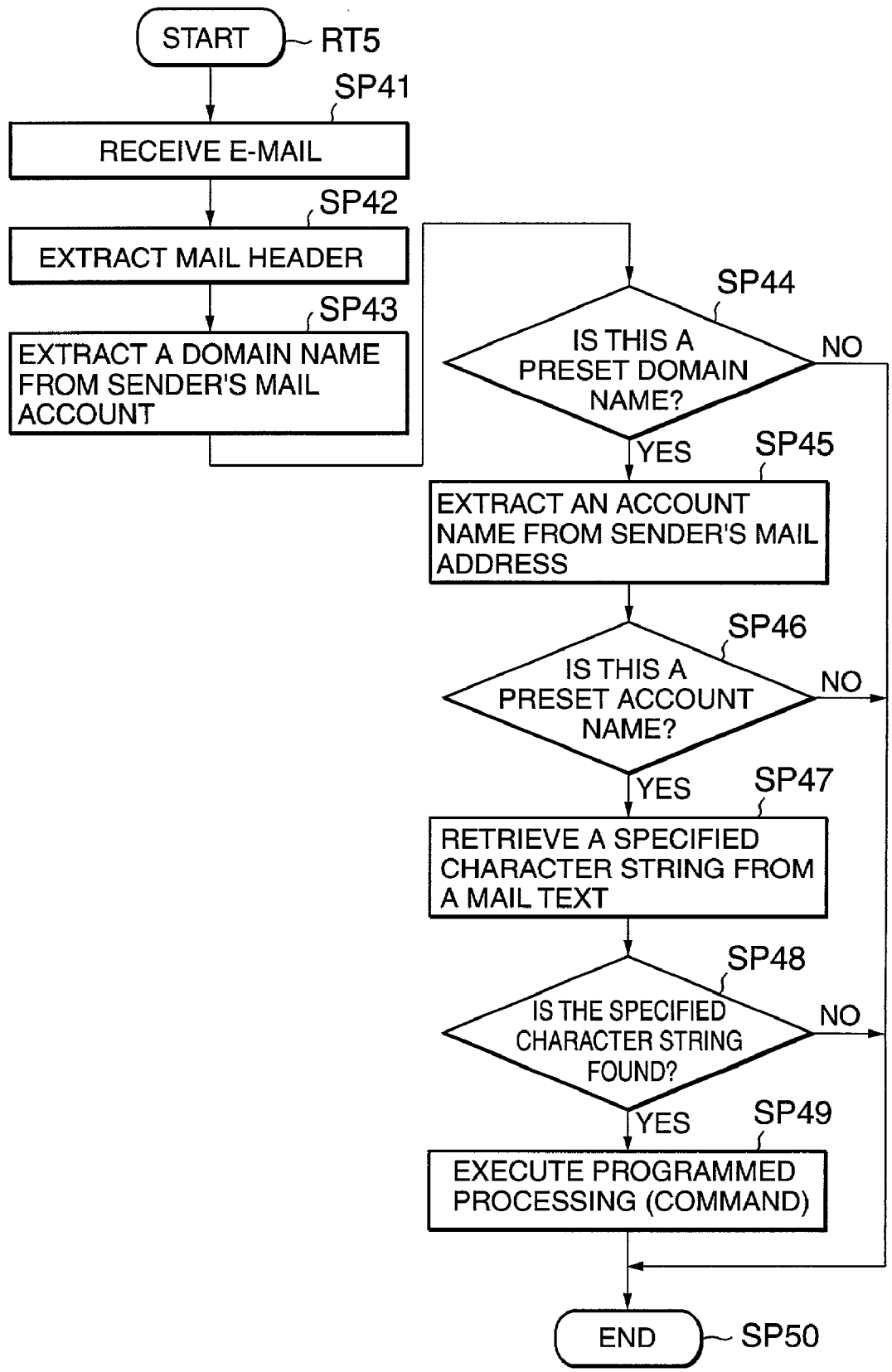
FIG.18 COMMAND EXECUTION PROCEDURE 5 ON RECEIVING E-MAIL

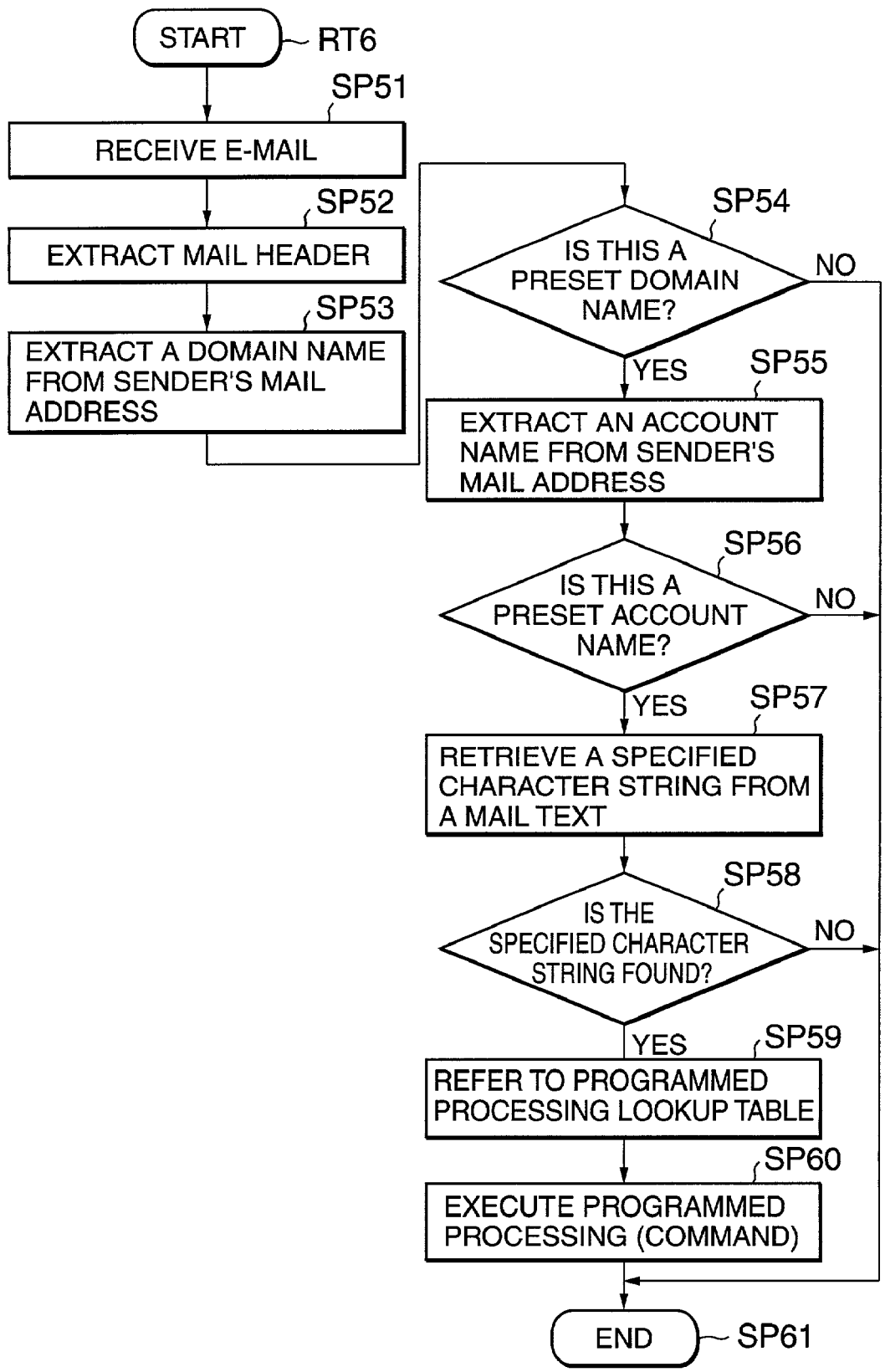
FIG.19 COMMAND EXECUTION PROCEDURE 6 ON RECEIVING E-MAIL

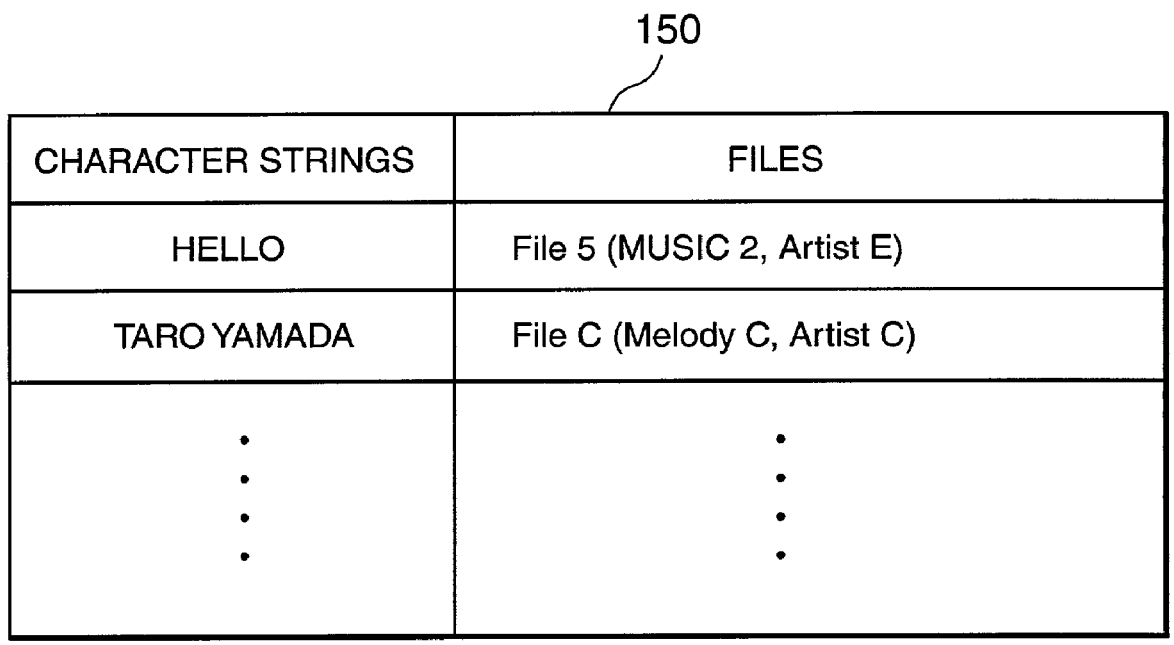
FIG.20 PROGRAMMED PROCESSING LOOKUP TABLE CORRESPONDING TO CHARACTER STRINGS

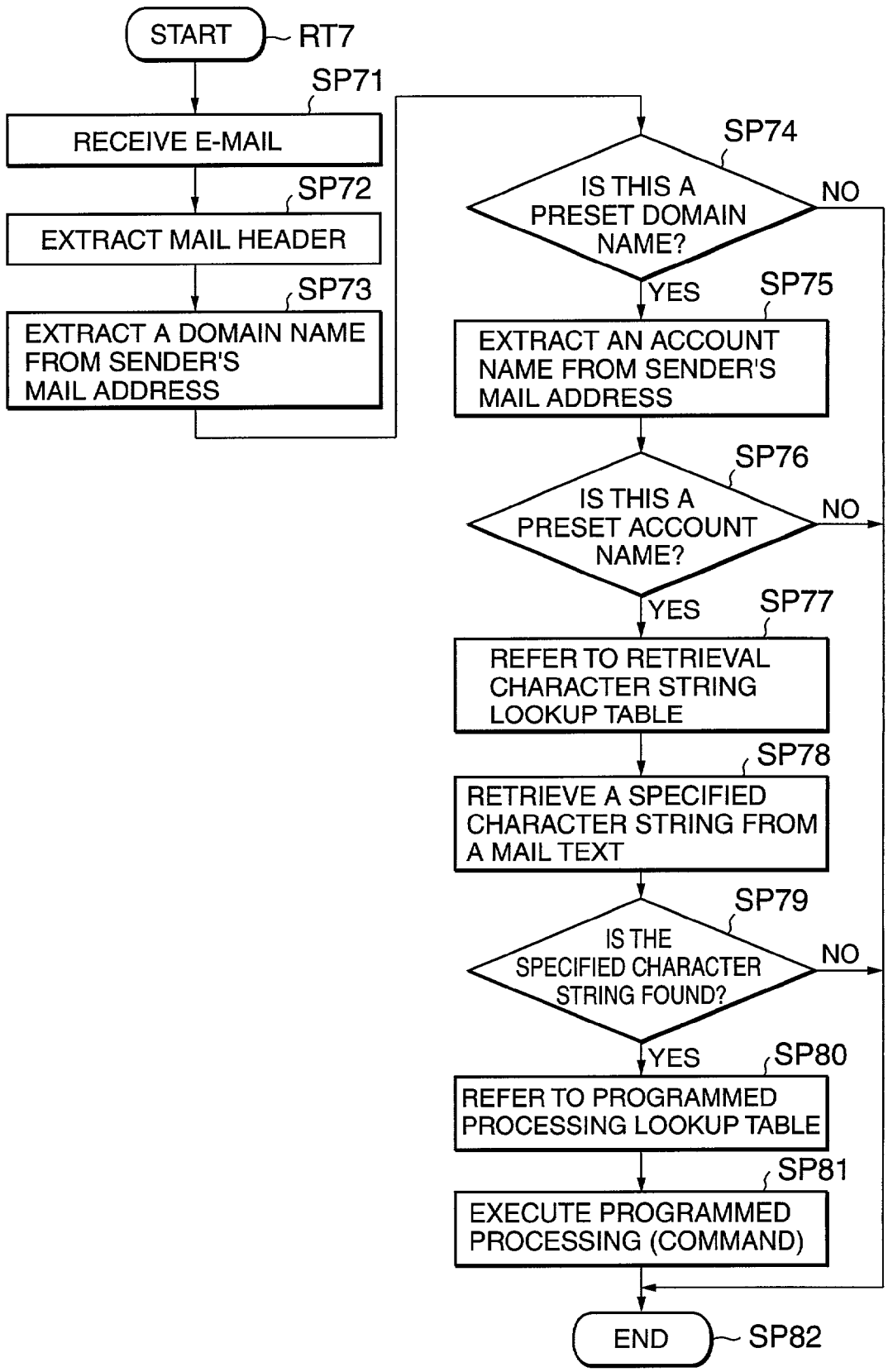
FIG.21 COMMAND EXECUTION PROCEDURE 7 ON RECEIVING E-MAIL

| MAIL ACCOUNTS | CHARACTER STRINGS |
|---|---|
| ukemero | HELLO |
| TEST | TARO YAMADA |
| ABCDEF | GOOD EVENING |
| ⋮ | ⋮ |

FIG.22 RETRIEVAL CHARACTER STRING LOOKUP TABLE CORRESPONDING TO MAIL ACCOUNTS

| NO | MAIL ACCOUNT (CHARACTER STRING PRECEDING @) | COMMANDS | CONTENTS OF PROCESSING |
|---|---|---|---|
| 1 | URL¥ARGUMENT(=abc.defg.co.jp) | GetURL (ARGUMENT) | START THE BROWSER, THEN OPEN A WEB PAGE CORRESPONDING TO ARGUMENT (=abc.defg.co.jp) |
| 2 | SAY¥ARGUMENT(=HELLO_1) | SAY(ARGUMENT) | REPRODUCE A MUSIC FILE NAMED ARGUMENT (=HELLO_1) TO OUTPUT FROM THE SPEAKER |
| 3 | POP¥ARGUMENT(=MSG_A) | POPUP (ARGUMENT) | OPEN THE POPUP WINDOW, AND DISPLAY CONTENTS OF THE FILE NAMED ARGUMENT (=MSG_A) |
| 4 | | | |

170

FIG.23  PROGRAMMED PROCESSING LOOKUP TABLE ACCORDING TO ANOTHER EMBODIMENT OF THE INVENTION

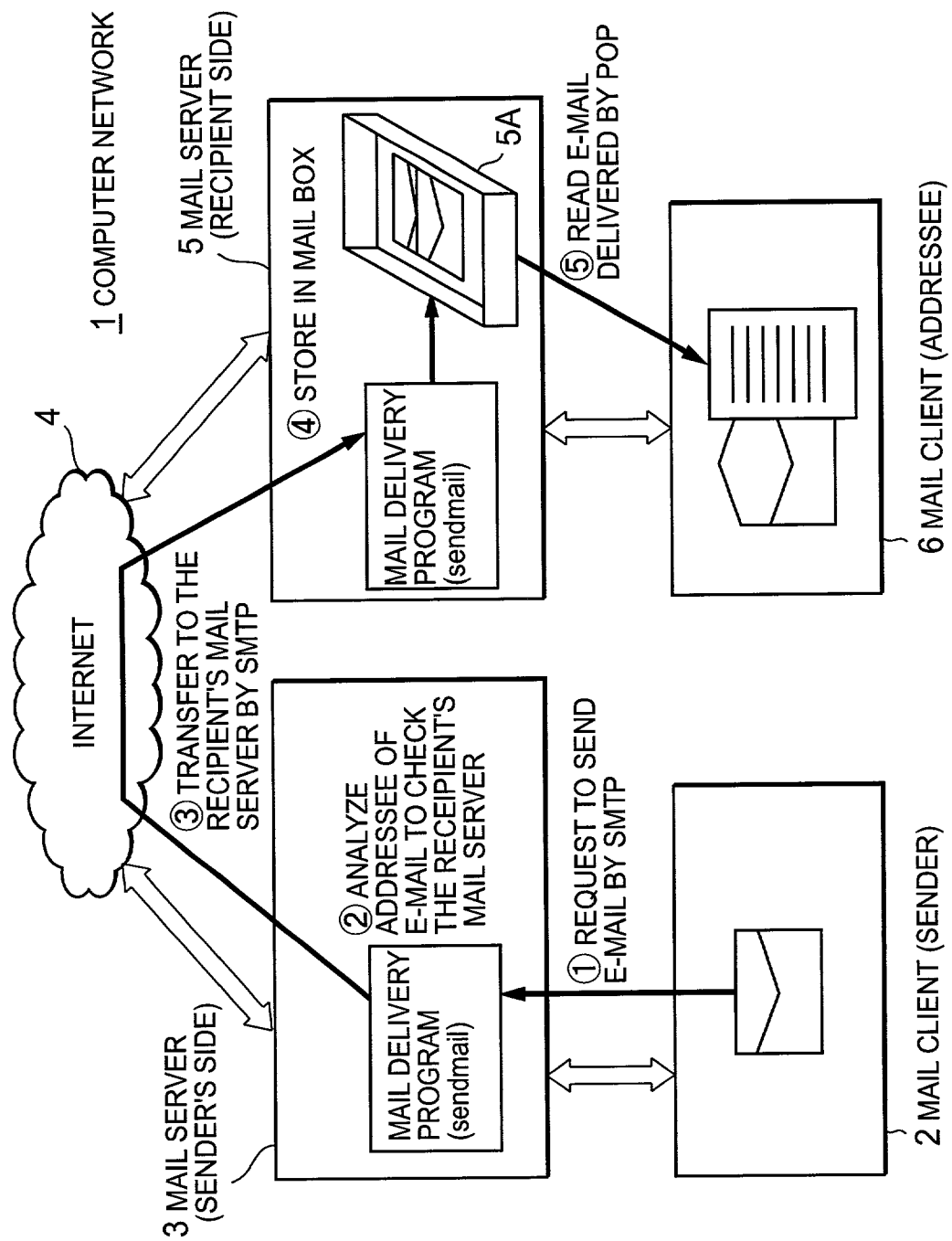
FIG.24 E-MAIL DELIVERY CONFIGURATION

INFORMATION PROCESSING SYSTEM FOR E-MAIL, INFORMATION PROCESSING METHOD AND PROGRAM STORAGE MEDIUM THEREFOR

BACKGROUND OF THE INVENTION

1. Field of the Invention

The present invention relates to an information processing system for an e-mail (electronic-mail), an information processing method and a program storage medium therefor, which are suitable for application to personal computers or the like that carry out, for example, an e-mail transmission and reception.

2. Related Art

Among many number of internet applications in use in a recent computer network system in which a plurality of personal computers are connected to each other via the internet, the most popular application that is attracting the largest number of users is an electronic mail (e-mail) service, hence, the number of users who are motivated to start the internet service because "I just wanted to use an e-mail" is increasing substantially.

An object of using such an e-mail service is considered to reside mainly in transmission and reception of messages between a plurality of personal computers or the like via a network, and is limited to a feature of transmitting/receiving picture data and/or music data at most as its advanced version, thereby utilizing the e-mail simply as an alternative to a hand-written letter or a post card.

Namely, the e-mail is developing as an alternative communication means faster than a postal mail, which can be communicated between a mail sender and a mail recipient simply and easily using not only personal computers but also portable information equipment such as portable telephones, a PHS (Personal Handyphone System) and a PDA (Personal Digital Assistants).

Further, the e-mail contains a mail header information as a part of its transmission/reception information so as to ensure for the e-mail to be delivered to a specified mail recipient according to a mail address contained in the mail header information, and also to inform the recipient who is a sender of the e-mail, which is known from a name of the sender contained in the mail header information.

Here, the so-called mail header information contains information corresponding to a mailing address, a name of an addressee and those of a sender in the postal mails, which are to be used in communication of the e-mail between the sender and the recipient.

As this mail header information for transmitting/receiving an e-mail using personal computers, a domain name of a DNS (Domain Name System) is used as an address (addressee) of its e-mail.

For example, when sending an e-mail to a mail recipient user who subscribes to a mail server having "abcd.co.jp" which is set up as its domain name, and who has a user name (=mail account) of "name", a mail sender specifies a mailing address by inserting "@" between the mail account and the domain name such as name@abcd.co.jp, thereby designating the recipient user (affixed with "name") as its addressee who subscribes to the mail server which was set up under the domain name of "abcd.co.jp" under control of "abcd" company.

A significant difference between electronic mail communications on the basis of the internet described above and on the basis of interpersonal computers resides in that a large number of mail servers are distributed in the former case, therefore, a respective mail server is normally provided for a respective domain in an electronic mail system on the internet.

Therefore, a client user will transmit and receive an e-mail to and from a mail server having a domain name to which the client user belongs. At this time, a transfer of the e-mail will be carried out using the SMTP (Simple Mail Transfer Protocol) which is a host protocol of the TCP/IP (Transmission Control Protocol/Internet Protocol).

In practice, in a computer network system 1 as illustrated in FIG. 24, a mail client 2 on the side of a mail sender requests a mail server 3 to which the mail client 2 belongs a transmission of an e-mail by the SMTP as a first step (1).

A mail server 3 on the side of the mail sender analyzes the address of the e-mail according to a mail delivery program "sendmail" as a second step (2) and makes inquiry to a DNS (Domain Name System) server in the domain of the e-mail address about an IP (Internet Protocol) address of a mail server 5 on the side of the mail recipient, then as a third step (3), sends the e-mail to the mail server 5 on the side of the addressee via an internet 4.

The mail server 5 on the side of the mail recipient receives the e-mail sent via the internet 4 in accordance with the mail delivery program "sendmail" in a fourth step (4), and stores the e-mail temporarily in a mail box 5A which is provided for each mail recipient based on each mail account for a dedicated use therefor.

A mail client 6 on the side of the mail recipient makes access to the mail server 5 using a mailer (a software) for use in writing e-mails and transmission/reception thereof as a fifth step (5), and is allowed to read e-mails addressed to the mail recipient and stored in the mail box 5A in accordance with a protocol such as a POP (Post Office Protocol) or the like.

At this time, the mail client 6 on the side of the recipient is allowed to download a newly arrived e-mail in accordance with the mailer (the software for use in writing and transmission/reception of e-mail) when a new e-mail has arrived at the mail server 5 on the side of the recipient, and at the same time, the mail recipient is informed of arrival of the new e-mail by means of a display of a popup window on a display screen, sounding of a preset receiving alarm, or reproducing of a preset sound message.

However, in the computer network system 1 having such configuration described above, because the mail client 6 on the side of the recipient of the e-mail is notified of the arrival of the new e-mail only by a predetermined uniform notification method common to all clients, the mail recipient is unable to determine who is the sender of the e-mail, what its contents are, what priority of importance it has or the like at the time of reception of the e-mail.

Incidentally, there is a so-called push type information delivery scheme as an active method of delivering information from an information originator such as a contents service provider or the like to a plurality of unspecified users who are connected to the internet via an internet connecting service provider.

In such push type information delivery systems, there are such problems that because a data format used for sending such information is unique to each system and is different from a general data format, a user side personal computer must install a push type information reception software installed which is different from the mailer for use in the e-mails, and also the push type information originator/sender must have a large scaled push type information delivery software installed, thereby forcing the information sender to bear an increased cost.

SUMMARY OF THE INVENTION

The present invention is contemplated to solve the above-mentioned problems associated with the conventional art, and to propose a novel information processing system, a novel information processing method and a program storage medium therefor, for enabling automatically to execute a predetermined processing preset in advance upon reception of an e-mail, and which can be implemented in a simple configuration.

In order to solve the above-mentioned problems, it is arranged according to the invention such that by downloading e-mails addressed to the mail recipient from a predetermined server, extracting a predetermined character string contained in the e-mail downloaded from the server, and executing a preset processing correlated in advance with the character string extracted, the preset processing correlated in advance with the extracted character string can be automatically executed upon downloading of the e-mail addressed to the recipient via the server.

BRIEF DESCRIPTION OF THE DRAWINGS

In the accompanying drawings:

FIG. 1 is a schematic block diagram illustrating a configuration of a computer network system embodying the invention;

FIG. 2 is a table showing basic commands of the SMTP and their contents;

FIG. 3 is a schematic diagram illustrating an e-mail transmission by the SMTP;

FIG. 4 is a table showing basic commands of the POP 3 and their contents;

FIG. 5 is a schematic diagram illustrating an e-mail read-out procedure by the POP 3;

FIG. 6 is a perspective view of a lap top type personal computer and its mechanism;

FIG. 7 is a schematic diagram of the lap top type personal computer showing its arrangement on the left side portion;

FIG. 8 is a schematic block diagram showing a circuit configuration of the lap top type personal computer;

FIG. 9 is a block diagram for explanation of a reception processing of the e-mail between a provider and a personal computer;

FIG. 10 is a diagram showing an example of a set-up screen layout;

FIG. 11 is a diagram showing a music title display screen at the time of receiving the e-mail;

FIG. 12 is a flowchart showing a command execution procedure 1 when receiving the e-mail.

FIG. 13 is a flowchart showing a command execution procedure 2 when receiving the e-mail;

FIG. 14 a correlation (lookup) table in part showing each programmed processing correlated with each domain name;

FIG. 15 is a flowchart showing a command execution procedure 3 when receiving the e-mail;

FIG. 16 is a flowchart showing a command execution procedure 4 when receiving the e-mail;

FIG. 17 is a correlation (lookup) table in part showing each programmed processing correlated with each mail account;

FIG. 18 is a flowchart showing a command execution procedure 5 when receiving the e-mail;

FIG. 19 is a flowchart showing a command execution procedure 6 when receiving the e-mail;

FIG. 20 is a correlation (lookup) table in part showing each programmed processing correlated with each character string;

FIG. 21 is a flowchart showing a command execution procedure 7 when receiving the e-mail;

FIG. 22 is a correlation (lookup) table in part showing each retrieval character string correlated with each mail account;

FIG. 23 is a part of a correlation table showing programmed processing according to another embodiment of the invention; and FIG. 24 is a schematic block diagram for explaining an electronic mail delivery mechanism.

PREFERRED EMBODIMENT OF THE INVENTION

Preferred embodiments of the invention will be described more specifically with reference to the accompanying drawings in the following.

(1) A General Configuration of the Computer Network System of the Invention:

With reference to FIG. 1, numeric 10 indicates a general configuration of the computer network system according to the invention, in which internet service providers (hereinafter, referred to as a provider) 12, 13 are connected continually to each other via an internet 11, and at the same time these providers 12 and 13 are allowed to access from personal computers 16 and 17 respectively by public networks 14, 15 according to an on-call dial-up IP.

Further, in the computer network system 10, a contents service provider 18 is connected to the network system via the internet 11. This contents service provider 18 is allowed to deliver information to personal computers 16 and 17 in response to their requests, this information including a text file which is described in a so-called HTML (Hyper Text Markup Language) for displaying various home pages, a picture and/or an audio file associated with this text file via a so-called HTTP (Hyper Text Transfer Protocol) communication protocol.

By the way, the following description of the invention will be made assuming that in the computer network system 10 embodying the invention, the personal computer 16 is on the side of the recipient of the e-mail and the personal computer 17 is on the side of the sender of the e-mail. However, it should be noted that this relation is not always absolute, and this relation may be reversed such that the personal computer 16 is on the side of the sender of the e-mail and the personal computer 17 is on the side of the recipient of the e-mail.

Namely, it is arranged normally such that the personal computer 17 on the side of the sender of e-mail transmits an e-mail to a specific address via the provider 13 connected thereto, and the personal computer 16 on the side of the recipient of e-mail receives the e-mail addressed to the specific recipient via the provider 14 connected thereto.

In this e-mail transfer between the provider 12 at the recipient and the provider 13 at the sender is carried out using the SMTP (Simple Mail Transfer Protocol) whereby each basic command consisting of a character string and its correlated response code/function as shown in FIG. 2 are exchanged therebetween to accomplish the transfer of the e-mail.

Namely, as illustrated in FIG. 3, sending of a HELLO command from a mail server in the provider 13 on the side of the mail sender (hereinafter referred to as the sender side server) to a mail server in the provider 12 on the side of the mail recipient (hereinafter referred to as the recipient side server) activates transmission/reception of a message.

Then, the sender side server notifies the recipient side server of a sender's mail address using a MAIL command. Upon return of a response code indicating readiness of reception from the recipient side server, the sender side server sends a mail address of the recipient using a RCPT command. Then, upon return of a response of "OK" from the recipient side server, the sender side server sends a DATA command to the recipient side server.

Subsequently, in response to a message from the recipient side server notifying a readiness of reception thereof, the sender side server transfers a main text of the e-mail to the recipient side server. Upon completion of transfer of the main text of the e-mail, the sender side server sends a combination code of "CR/LF, CR/LF" to the recipient side server.

Finally, upon reception of a response of "OK" from the recipient side server, the sender side server sends a QUIT command to the recipient side server thereby terminating the communication.

Practically, in an OS (Operation System) in a group of the UNIX which is widely used as the mail server, "sendmail" program is often used in the communication by the SMTP. Also, in the case where an e-mail is sent by a user side mailer, the e-mail is sent directly using the "sendmail" program and the SMTP.

There are several methods for delivering e-mails to the mail recipient, however, now the most popular one is such a method whereby a "sendmail" process that receives an e-mail first, makes inquiry to a DNS (Domain Name System) server of an addressee's domain about an IP (Internet Protocol) address of its mail server so as to be able to communicate directly with the "sendmail" program of that mail server and send the e-mail thereto.

Recently, in order to prevent reception of a SPAM mail, there are some mail servers that trace back an IP address of a sender client to check its domain name, and determine whether or not its domain name coincides with the domain name of the mail address. Because the SMTP is not provided with a function to authenticate the sender, the mail address of the sender can be easily counterfeited.

A delivered e-mail is stored as a file in a directory dedicated for use of a respective user (hereinafter referred to as a mailbox). When reading the e-mail stored in the mail server operating on the UNIX by the mailer on the personal computer 16, the POP (Post Office Protocol) that is a host protocol of the TCP/IP (Transmission Control Protocol/Internet Protocol) is used in most cases.

There are several versions of the POP, however, a so-called POP 3 protocol of a version 3 is presently used for reading the e-mail. Up to the POP 2 of version 2, e-mails could have been read only with the user name, however, in the POP 3, authentication both of the user name and the password is required.

In an access with the POP 3, after authentication both of the user name and the password, using POP 3 commands as shown in FIG. 4, a status verification of the mailbox (the number of e-mails received and a status if it is read) and downloading of the e-mails are executed. Lastly, updating (physical deletion of the e-mails designated by the client or the like) of the mailbox is performed on the mail server.

Namely, the recipient side personal computer 16 sends an access request to the mail server (POP 3 server) of the provider 12 as shown in FIG. 5, and upon return of a response of "OK" therefrom, sends a user name and a password to the POP 3 server.

Then, the recipient side personal computer 16, upon return of a response of "OK" from the POP 3 server, sends various commands (for example, LST command and the like) to the POP 3 server. Subsequently, when the e-mail is downloaded from the POP 3 server in response to the commands described above, the recipient side personal computer 16 sends a QUIT command to the POP 3 server. Upon return of a response of "OK", the communication with the POP 3 server is caused to end.

In addition to the POP 3 described above, as another protocol used for reading e-mails from the mailbox, there is an IMAP (Internet Mail Access Protocol) 4, which is provided with more commands and versatile functions available compared to the POP 3, thereby allowing for the user to produce/delete a mailbox, or designate a shared mailbox. Therefore, many of the recently developed group-ware products and mail client software are allowed to correspond to the IMAP 4.

(1-1) A General Configuration of the Personal Computer:

With reference to FIG. 6, the personal computer 16 is a note-book type computer, which is comprised of a main body 21 and a display portion 22 closably attached to the main body 21, wherein by attaching the display portion 22 closably relative to the main body 21, an upper surface 21A of the main body 21 and a front surface 22A of the display portion 22 are allowed to be closed (not shown) or opened.

On the upper surface 21A of the main body 21, there are arranged a plurality of operation keys 23 for entering various characters, symbols, numerals and the like, a touch pad 24 for use of moving a mouse cursor, a left-hand side click button 25 and a right-hand side click button 26 corresponding to the left and the right buttons of a normal mouse, and speakers 27A, 27B.

In the display portion 22, a liquid crystal display 28 is provided on the frontal surface thereof. Further, in the display portion 22, a hook 29 is provided at an upper center portion of the frontal surface. Also, a latch hole 30 is provided at a predetermined portion of the main body 21 corresponding to this hook 29 so as to allow the hook 29 to fit into the latch hole 30 and to be locked when the display portion 22 is closed relative to the body 21.

In addition to the above, a slide lever 31 is provided at the upper end of the display portion 22. By sliding this slide lever 31, the lock of the hook 29 engaged with the latch hole 30 is released to allow the display portion 22 to be deployed relative to the body 21.

Further, on the front side of the body 21, there are provided a power lamp PL, a battery lamp BL and a message lamp ML arranged alongside, and also a microphone 32 is provided in the vicinity of these lamps PL, BL and ML. Incidentally, on the rear side of the body 21, there is mounted a battery 33 removably.

Still further, on the right-hand side of the body 21, there are provided a slide type power switch 34, a programmable power key 35, USB (Universal Serial Bus) terminals 36 and 37, a communication connector 38 for connecting a portable telephone or the like, an infrared port 39 in compliance with the IrDA (Infrared Data Association), and a modem terminal 40 for use of a modular jack.

On the other hand, on the left-hand side of the body 2 as shown in FIG. 7, there are provided a PC card slot 41 corresponding to a PC (Personal Computer) card of a PCMCIA (Personal Computer Memory Card International Association) standard, a slot 42 dedicated for use of a "Memory Stick" (Trademark of Sony Corporation) comprising a flash memory which is a kind of an nonvolatile semiconductor memory, a headphone terminal 43, an audio input terminal 44, an IEEE (Institute of Electrical and Electronics Engineers) 1394 terminal 45, a connector 46 for an external display, and an external power source connector 47 for a DC (Direct Current) power supply.

(1-2) Circuit Configuration of the Personal Computer:

Now, with reference to FIG. 8, in the personal computer 16, a CPU (Central Processing Unit) 5 that controls various functions in the body 21 in general is connected to a host bus 56. In order to implement the various functions thereof, the CPU 55 executes a respective processing in accordance with various programs and/or applications loaded in a RAM (Random Access Memory) 57 at a preset operating speed defined on the basis of a system clock provided from a clock generator 58.

Further, a cache memory 59 is connected to the host bus 56 for allowing the cache memory 59 to cache data which the CPU 55 uses thereby realizing a faster data access therefor.

The host bus 56 is connected to a PCI (Peripheral Component Interconnect) bus 60 via a host-PCI bridge 61. To this PCI bus 60 there are connected a video controller 62, an IEEE 1394 interface 63 and a PC card interface 64.

Here, the host-PCI bridge 61 has a function to control various data exchange between the CPU 55 and each of the video controller 62, the IEEE 1394 interface 63 and the PC card interface 64, and also to enable memory control of a RAM 57 which is connected thereto via a memory bus 65.

The host-PCI bridge 61 is connected to the video controller 62 also via a signal line along an AGP (Accelerated Graphics Port) so as to allow a faster transfer of picture data between the host-PCI bridge 61 and the video controller 62.

The video controller 62 controls to store a picture data supplied opportunely according to various application software into a built-in VRAM (Video Random Access Memory) and to read the same data therefrom to output to a liquid crystal display 28 so as to enable to display a plurality of window screens on the liquid crystal display 28.

The PC card interface 64 is connected to a PC card slot 41 to allow for a connection with a PC card which is inserted when adding an optional function to enable a connection with an external device such as a CD-ROM (Compact Disc-Read Only Memory) drive, a DVD (Digital Versatile Disc) drive and the like via the PC card.

The IEEE 1394 interface 63 is directly coupled to an IEEE 1394 terminal 45 to allow for a connection with an external device such as another computer device, a digital video camera and the like via the IEEE 1394 terminal 45.

The PCI bus 60 is connected to an ISA (Industrial Standard Architecture) bus 66 via a PCI-ISA bridge 67, and to this PCI-ISA bridge 67 there are connected USB terminals 36, 37 and a HDD (Hard Disc Drive) 68.

Here, the PCI-ISA bridge 67 is comprised of an IDE (Integrated Drive Electronics) interface, a configuration register, an RTC (Real Time Clock) circuit and an USB interface, and controls the hard disc drive 68 via the IDE interface on the basis of a system clock given from the clock generator 58.

On a hard disc in the hard disc drive 68, there are stored OS (Operating System) such as Windows98 (Trade Mark of Microsoft Corporation), an auto pilot program, other various programs and application softwares, which are transferred to the RAM 57 opportunely in the course of a start operation.

Further, the PCI-ISA bridge 67 controls an external device (not shown) such a floppy disc drive, a printer and a USB mouse which are to be connected via the USB terminals 36 and 37, and also controls a modem 70 and a sound controller 71 which are connected to the ISA bus 66.

The modem 70 is allowed to access from a modem terminal 40 connected thereto to the provider 12 via the public network 14. The sound controller 71 picks up an audio signal entered from a microphone 32, and outputs the audio signal to speakers 27A, 27B.

Further, an I/O (Input/Output) controller 72 is connected to the ISA bus 66. The I/O controller 72 is supplied power from an external power connector 47 via a power supply/charge control circuit 73, and supplies power to a respective circuit when a power switch 34 is turned on.

Incidentally, the I/O controller 72 operates on the system clock supplied from the clock generator 58. Further, the power supply/charge control circuit 73 controls charging of a battery pack 33 under the control of the I/O controller 72.

Actually, the I/O controller 72 is comprised of a micro controller, an I/O interface, a CPU, a ROM (Read Only Memory), a RAM and the like, and which controls input and output of data between the OS or the application software and various peripheral devices such as the liquid crystal display 28 or the hard disc drive 68 on the basis of a BIOS (Basic Input/Output System) stored in the flash memory 74.

Further, the I/O controller 72 is connected to an infrared port 39 so as to enable an infrared communication to be executed with another computer device or the like.

By the way, in the ROM of the I/O controller 72 there are stored a wakeup program, a keying monitor program, an LED control program and various other control programs.

The wakeup program is a program for activating the CPU 55 to execute a predetermined process when a current time supplied from the RTC circuit in the PCI-ISA bridge 67 becomes a preset start time. The keying monitor program is a program for monitoring an input operation via an operational key 23, a programmable power key 35, a touch pad 24, a left-hand click button 25 and a right-hand click button 26, and other various key switches.

The LED control program is a program for controlling on/off operation of various lamps made of LEDs such as a power lamp PL, a battery lamp BL, a message lamp ML and the like.

Also in the RAM of the I/O controller 72, there are provided a time setup register for use of the wakeup program, a keying monitor register for use of the keying monitor program, an LED control register for use of the LED control program, and other registers for use of other various programs.

The time setup register is provided to store a time data for starting a specific processing the user has set up at discretion in advance for use of the wakeup program. Therefore, the I/O controller 72 determines if its current time supplied from the RTC circuit according to the wakeup program coincides with the preset time data for starting the processing set up by the user at discretion, and if it does, notifies the CPU 55 sequentially via the ISA bus 66, the PCI-ISA bridge 67 and the host-PCI bridge 61 of its coincidence.

Thereby, the CPU 55, upon arrival of the preset start time, loads a preset application software program corresponding to the preset time data for starting, hence to execute a preset processing according to the loaded application software program.

The keying monitor register stores a manipulation key flag according to a respective input through the operation key 23, a programmable power key 35, a touch pad 24, a left-hand side click button 25, a right-hand side click button 26 and the like. Therefore, the I/O controller 72 determines if a pointing operation, for example, with the touch pad 24 is executed, or if a click operation with the left-side and/or the right-side click buttons 25, 26 are executed on the basis of a storage status of respective key flags, and if the pointing operation or the keying operation is executed, notifies the CPU 55 of this operation.

Incidentally, the pointing operation refers to an act of rubbing a pad surface of the touch panel 24 with a finger in order to move, for example, the mouse cursor to a desired position, and the click operation refers to an act of depressing and releasing of the left-hand side click button 25 or the right-hand side click button 26 quickly with the finger.

Thereby, the CPU 55 is enabled to execute a predetermined processing in response to the pointing operation on the touch pad 24, and the click operation with the left-hand side click button 25 or the right-hand side click button 26.

The LED control register stores on-flags indicating on/off status of various lamps made of LEDs such as the power lamp PL, battery lamp BL, message lamp ML and the like. Therefore, for example, when the CPU 55 reads out the electronic mail program from the hard disc of the hard disc drive 68 by a click operation of the left-hand side click button 25 to install the program on the RAM 57 and then receives an e-mail according to the electronic mail program, the I/O controller 72 stores an on-flag in the LED control register, and also turns on the message lamp ML according to this on-flag.

(2) E-mail Reception Procedure Between the Provider and the PC:

Now, with reference to FIG. 9, a procedure required for the personal computer 16 to go through until it receives an e-mail addressed thereto from the provider 12 will be described in the following. At first, the personal computer 16 accesses to the provider 12 via the public communication network 14.

Then, the provider 12, after executing an authentication processing in its communication server 82 on the basis of a user name and a password sent from the personal computer 16 via a modem 81, transmits a receiving melody reproducing program embodying the invention from its Web server 84 to the personal computer 16 via a LAN (Local Area Network) 83 in response to a download request thereof.

Thereby, the personal computer 16 installs the receiving melody reproducing program downloaded from the provider 12 into the hard disc of a HDD 68.

Here, the receiving melody reproducing program is a program for automatically reproducing, for example, a musical file corresponding to a sender of an e-mail when the mail recipient receives the e-mail addressed thereto, and if the mail address of the sender of the e-mail is registered in advance in the receiving melody reproducing program correlated with the musical file.

Then, the CPU 55 (in FIG. 8) in the personal computer 16 having installed the receiving melody reproducing program displays at first a setup screen 110 on the liquid crystal display 28 according to the receiving melody reproducing program as shown in FIG. 10.

On this setup screen 110, and in a mail address display portion 111 there are displayed a plurality of mail addresses of mail senders who are likely to send e-mails to this recipient. Further, in a selective musical title display portion 112 there are displayed a plurality of musical titles of musical files to be reproduced in conjunction with their artist names as correlated with respective mail addresses of these mail senders.

By manipulating the touch pad 24 or the mouse, the user scrolls up and down a highlighted (reversal display or slashed) portion in the mail address display portion 111 to select a preferred mail address (for example, ukemero@test.abcd.co.jp), then also in the selective musical title display portion 112, the user scrolls up and down a highlighted (slashed) portion to select a preferred melody (for example, "Musical title: Melody A, Artist name: Artist A") to be correlated with the mail address selected above.

Thereby, the CPU 55 in the personal computer 16 enables to register the mail address and the musical file selectively correlated to each other according to the receiving melody reproducing program in the hard disc of the HDD 68. Further, when a correlation between a plurality of mail addresses and a plurality of musical files is given, the CPU 55 generates a programmed processing correlation (lookup) table for reproducing a respective music melody corresponding to a respective mail address correlated therewith to be registered in the hard disc of the HDD 68.

Further, when a new e-mail is sent from an unknown new e-mail sender with no record of e-mail reception, the CPU 55 is allowed automatically to store the mail address of the new sender in the hard disc of the HDD 68 and add to the list of the mail address display portion 111, thereby enabling easily to correlate a preferred melody the user desires to attach with respect to the mail address newly added to on the display.

By the way, the personal computer 16 is also capable of directly registering any mail address via the operation key 23, as well as adding on a new music file the user desires to its options by converting its music data into a predetermined format using a predetermined application software.

In the following description of the personal computer 16 (FIG. 9) having installed the receiving melody reproducing program, for the convenience of explanation, a respective description is given for each of functional blocks of software which are virtually divided into modules of: an e-mail receiving portion 90 for receiving e-mails according to the e-mail program (mailer); a mail header extract processing portion 91 for extracting the mail header information of the e-mail according to the receiving melody reproducing program; and a programmed (command) processing portion 92 for reproducing a music file corresponding to the mail address contained in the mail header information. In practice, however, all processing in respective modules described above is executed by the CPU 55.

On the other hand, the provider 12 transfers the e-mail which is addressed to the personal computer 16 and sent from the personal computer 17 on the side of the sender (refer to FIG. 1) via the internet 11 to the mail server 85 via a router 86 and the LAN 83. After sorting e-mails according to their addresses, the mail server 85 stores the e-mail addressed to the personal computer 16 in a mailbox dedicated for use thereof.

In order to receive the e-mail addressed to the personal computer 16, an e-mail receive portion 90 in the personal computer 16 accesses to the provider 12 via a modem 70 and the public network 14 to be granted an access authentication by the communication server 82.

Then, the e-mail receive portion 90 sends a request to download the e-mail addressed thereto according to the e-mail program to the provider 12. After verification of a status of the mailbox (the number and/or status of e-mails received, stored and read out) in the mail server 85 using POP 3 commands, the e-mail receive portion 90 downloads the e-mail addressed thereto.

At the same time, a mail header information extract processing portion 91 monitors constantly all e-mails being downloaded by the e-mail receive portion 90 according to the receiving melody reproducing program, and extracts only a mail header information from these e-mails.

Then, upon retrieval of a music file corresponding to the mailing address of the mail sender contained in the extracted mail header information (i.e., a portion of "From: ukemero@test.abcd.co.jp") by referring to a programmed processing correlation (lookup) table 93, the mail header information extract processing portion 91 reads out the retrieved music file from the hard disc of the HDD 68 and transfers the same to a program processing portion 92.

The program processing portion 92 executes a processing to reproduce the music file supplied from the mail header information extract processing portion 91 using a sound chip (not shown) in the sound controller 71 (in FIG. 8) and output from the speakers 27A and 27B, and at the same time, displays a music title display screen 120 on the liquid crystal display 28 as shown in FIG. 11, on the basis of a text data indicating the music title and the name of the artist, contained in the music file.

At the same time when the melody corresponding to the music file is sounded from the speakers 27A, 27B, this music title (melody) display screen 120 is displayed at an upper left portion of the liquid crystal display 28 to notify the user about the title of the music (=Melody A) and the name of the artist (=Artist A) on air from the speakers 27A, 27B.

Incidentally, for example, if a picture file or the like as to the artist is attached to the music file, the program processing portion 92 while reproducing the melody is allowed to display the picture file on the liquid crystal display 28 via the video controller 62.

As described above, when the personal computer 16 receives the e-mail addressed thereto from the provider 12 and when the sender's mailing address in the e-mail received coincides with the mailing address which was set up and registered in advance in the disc, the personal computer 16 reproduces a music file which is correlated with this mailing address to be output from the speakers 27A and 27B, and at the same time, displays the melody display screen 120 on the liquid crystal display 28, thereby notifying the user by sounding the melody associated with the sender or displaying the melody display screen 120 indicating the title of the melody and the name of the artist thereby notifying the user who is the sender of the e-mail upon arrival thereof.

(2-1) Command Execution Procedure 1 at the Time of Receiving E-mail:

With reference to FIG. 12, the personal computer 16 enters into its command execution procedure 1 from a start step of a routine RT1 and goes to a step SP1. In step SP1, the e-mail receive portion 90 as an e-mail input means downloads the e-mail addressed thereto from the provider 12 according to the e-mail program, then moves to a next step SP2.

In step SP2, the mail header information extract processing portion 91 as a mail character string extract means monitors an e-mail being downloaded to the e-mail receive portion 90 according to the receiving melody reproducing program so as to extract only its mail header information, then the step goes to SP3.

In step SP3, the mail header information extract processing portion 91 reads out a domain name from the mailing address of the mail sender in the mail header information, then goes to step SP4.

In step SP4, the mail header information extract processing portion 91 determines if its domain name read out coincides with any domain name which has been registered in the hard disc in advance.

When a negative result is obtained here, which means that the domain name of the sender of the e-mail received does not coincide with any one of the domain names registered in the hard disc in advance, the mail header information extract processing portion 91 moves to step SP6 to end its processing.

In contrast to the above, if an affirmative result is obtained in step SP4, which means that the domain name of the e-mail sender received coincides with one of the domain names registered in advance in the hard disc, the mail header information extract processing portion 91 reads out a music file from the hard disc of the HDD 68, which is correlated with the mailing address extracted from the mail header information, and sends it to the program processing portion 92, then goes to step SP5.

In step SP5, the program processing portion 92 as a control means executes a processing to reproduce the music file correlated with the extracted domain name using the sound chip to output from the speakers 27A, 27B, and at the same time, displays the melody title display screen 120 on the liquid crystal display 28 via the video controller 62, then moves to step SP6 to end its procedure.

(2-2) Command Execution Procedure 2 When Receiving E-mails:

With reference to FIG. 13, the personal computer 16 enters from a routine RT2 to start its procedure 2, and goes to step SP11. In step SP11, the e-mail receive portion 90 as an e-mail input means downloads the e-mail addressed thereto from the provider 12 according to the e-mail program, then goes to step SP12.

In the step SP12, the mail header information extract processing portion 91 as the mail character string extract means monitors e-mails being downloaded to the e-mail receive portion 90 according to the receiving melody reproducing program, and extracts only the mail header information from the downloading e-mails, then the step goes to step SP13.

In the step SP13, the mail header information extract processing portion 91 reads out the domain name from the sender's mailing address in the mail header information, then the step goes to step SP14.

In the step SP14, the mail header information extract processing portion 91 determines if the domain name read out coincides with any domain name registered in advance in the hard disc.

Here, if a negative result is obtained, which means that the domain name of the sender's mailing address in the received e-mail coincides with none of the domain names registered in advance in the hard disc, the mail header information extract processing portion 91 moves to step SP17 to terminate its processing.

In contrast to the above, if an affirmative result is obtained in step SP14, which means that the domain name of the sender's mailing address in the received e-mail coincides with one of the domain names registered in the hard disc, the mail header information extract processing portion 91 goes to a next step SP15.

In the step SP15, the mail header information extract processing portion 91 refers to a programmed processing lookup table 130 as shown in FIG. 14, in which respective domain names registered are correlated with respective music files so as to retrieve a specific music file corresponding to the domain name extracted, then reads out this specific music file from the hard disc in the HDD 68, and sends the same to the program processing portion 92, then goes to a next step SP16.

In the step SP16, the program processing portion 92 as the control means executes a processing to reproduce this music file using the sound chip for outputting from the speakers 27A, 27B, and at the same time, displays the music title display screen 120 on the liquid crystal display 28, then the step moves to SP17 to end its processing.

(2-3) Command Execution Procedure 2 When Receiving E-mails:

Now, with reference to FIG. 15, the personal computer 16 enters from a routine RT3 to start a command execution procedure 3 and goes to a step SP21. In the step SP21, the e-mail receive portion 90 as the e-mail input means downloads the e-mail addressed thereto from the provider 12 according to the e-mail program, then the step goes to a next step SP22.

In the step SP22, the mail header information extract processing portion 91 as the mail character string extract means monitors an e-mail being downloaded to the e-mail receive portion 90 according to the receiving melody reproducing program, and extracts only its mail header information in the downloading e-mail, then the step goes to a next step SP23.

In the step SP23, the mail header information extract processing portion 91 reads out a domain name of the mail sender's mailing address in the mail header information, then the step goes to a next step SP24.

In the step SP24, the mail header information extract processing portion 91 determines if its domain name read out coincides with some domain name registered in advance in the hard disc.

Here, if a negative result is obtained, which means that the domain name in the mailing address of the sender who sent the e-email does not coincide with any of the domain names having been registered in advance in the hard disc, the mail header information extract processing portion 91 moves to a step SP28 where to terminate its processing.

In contrast to the above, if an affirmative result is obtained in step SP24, which means that the domain name in the mailing address of the sender who sent the e-mail coincides with one of the domain names having been registered in advance in the hard disc, the mail header information extract processing portion 91 goes to a next step SP25.

In the step SP25, the mail header information extract processing portion 91 extracts a mail account from the mail address of the e-mail sender, then the step goes to a next step SP26.

In the step SP26, the mail header information extract processing portion 91 determines if the mail account extracted coincides with any of the mail accounts having been registered in the hard disc in advance.

Here, if a negative result is obtained, which means that its extracted mail account does not coincide with any of the mail accounts having been registered in the hard disc in advance, the mail header information extract processing portion 91 moves to a step SP28 to terminate its processing.

In contrast to the above, if an affirmative result is obtained in step SP26, which means that its extracted mail account coincides with one of the mail accounts having been registered in the hard disc in advance, the mail header information extract processing portion 91 reads out a music file which corresponds both to the extracted domain name and the extracted mail account from the hard disc of the HDD 68, and sends the same to the program processing portion 92, then the step goes to a next step SP27.

In the step SP27, the program processing portion 92 as the control means executes a processing to reproduce the music file retrieved so as to output from the speakers 27A, 27B, and at the same time, displays the music title display screen 120 on the liquid crystal display 28 via the video controller 62, then the step goes to SP28 where to terminate the processing.

(2-4) Command Execution Procedure 4 When Receiving E-mails:

With reference to FIG. 16, the personal computer 16 enters from a routine RT4 to start a command execution procedure 4, and goes to a step SP31. In the step SP31, the e-mail receive portion 90 as the e-mail input means downloads the e-mail addressed thereto from the provider 12 according to the e-mail program, then the step goes to a next step SP32.

In the step SP32, the mail header information extract processing portion 91 as the mail character string extract means monitors the e-mail being downloaded to the e-mail receive portion 90 according to the receiving melody reproducing program, and extracts only the mail header information from the e-mail, then the step goes to a next step SP33.

In the step SP33, the mail header information extract processing portion 91 reads out the domain name from the mailing address of the mail sender in the mail header information, then the step moves to a next step SP34.

In the step SP34, the mail header information extract-processing portion 91 determines if the domain name having been read out coincides with a preset specific domain name having been registered in advance in the hard disc.

Here, if a negative result is obtained, which means that the domain name of the sender of the received e-mail coincides with none of the specific domain names having been registered in advance in the hard disc, the mail header information extract processing portion 91 moves to the step SP39 to terminate its processing.

In contrast to the above, if an affirmative result is obtained in step SP34, which means that the domain name of the sender of the received e-mail coincides with one of the preset specific domain names having been registered in advance in the hard disc, the mail header extract processing portion 91 goes to a next step SP35.

In the step SP35, the mail header information extract processing portion 91 extracts a mail account in the mailing address, then the step goes to a next step SP36.

In the step SP36, the mail header information extract-processing portion 91 determines if the mail account extracted coincides with a preset specific mail account having been registered in advance in the hard disc.

Here, if a negative result is obtained, which means that this mail account coincides with none of the preset specific mail accounts registered in the hard disc in advance, the mail header information extract processing portion 91 moves to a step SP39 to terminate its processing.

In contrast to the above, if an affirmative result is obtained in step SP36, which means that this extracted mail account coincides with the preset specific mail account registered in the hard disc in advance, the mail header information extract processing portion 91 goes to a next step SP37.

In the step SP37, the mail header information extract processing portion 91 refers to a programmed processing lookup table 140 as shown in FIG. 17 in which a respective mail account is correlated with a respective music file so as to retrieve a music file which corresponds to the mail account of the mail address having been extracted, and reads out this music file from the hard disc in the HDD 68, and sends the same to the program processing portion 92, then goes to a next step SP38.

In the step SP38, the program processing portion 92 as the control means executes a processing to reproduce this music file and output from the speakers 27A, 27B, and also displays the music title display screen 120 on the liquid crystal display 28 via the video controller 62, then moves to the step SP39 to terminate its processing.

(2-5) Command Execution Procedure 5 When Receiving E-mails:

Now, with reference to FIG. 18, the personal computer 16 enters from a routine RT5 to start a command execution procedure 5, and goes to a step SP41. In the step SP41, the e-mail receive portion 90 as the e-mail input means downloads the e-mail addressed thereto from the provider 12 according to the e-mail program, then goes to a next step SP42.

In the step SP42, the mail header information extract processing portion 91 as the mail character string extract means monitors the e-mail being downloaded to the e-mail receive portion 90 according to the receiving melody reproducing program, and extracts only its mail header information of the e-mail, then goes to a next step SP43.

In the step SP43, the mail header information extract processing portion 91 reads out a domain name from the mail address of the mail sender in the mail header information, then goes to a next step SP44.

In the step SP44, the mail header information extract processing portion 91 determines if the domain name read out coincides with any preset specific domain name having been registered in advance in the hard disc.

If a negative result is obtained here, which means that this domain name read out coincides with none of the preset specific domain names having been registered already, the mail header information extract processing portion 91 moves to a step SP50 to terminate its processing.

In contrast to the above, if an affirmative result is obtained in step SP4, which means that this domain name read out coincides with some of the preset specific domain names having been registered in the hard disc already, the mail header information extract processing portion 91 moves to a next step SP45.

In the step SP45, the mail header information extract processing portion 91 reads out a mail account from the mail address of the mail sender, then goes to a next step SP46.

In the step SP46, the mail header information extract processing portion 91 determines if this mail account coincides with any preset specific mail account having been registered in the hard disc already.

If a negative result is obtained here, which means that this mail account coincides with none of the preset specific mail accounts already registered in the hard disc, the mail header information extract processing portion 91 moves to a step SP50 to end its processing.

In contrast to the above, if an affirmative result is obtained in the step SP46, which means that this mail account coincides with some of the preset specific mail accounts already registered in the hard disc, the mail header information extract processing portion 91 goes to a next step SP47.

In the step SP47, the mail header information extract processing portion 91 searches if a preset character string (for example, "HELLO") registered in advance in the hard disc exists in a main text in the e-mail downloaded by the e-mail receive portion 90, then moves to a next step SP48.

In the step SP48, the mail header information extract processing portion 91 determines if the preset specific character string registered in advance is found in the text of the e-mail.

Here, if a negative result is obtained, which means that the preset specific character string registered in advance was not found in the text of the e-mail received, the mail header information extract processing portion 91 moves to the step SP50 to end the processing.

In contrast to the above, if an affirmative result is obtained in the step SP48, which means that the preset specific character string registered in advance was found in the text of the e-mail received, the mail header information extract processing portion 91 retrieves a music file that is correlated in advance with the preset specific character string, retrieves the music file from the hard disc in the HDD 68, and sends it to the program processing portion 92, then goes to a next step SP49.

In the step SP49, the program processing portion 92 as the control means executes a processing to reproduce the music file with the sound chip and to output from the speakers 27A, 27B, and at the same time, to display the music title display screen 120 on the liquid crystal display 28 via the video controller 62, then the step goes to the SP50 to terminate the processing.

(2-6) Command Execution Procedure 6 When Receiving E-mails:

With reference to FIG. 19, the personal computer 16 enters from a routine RT6 to start a command execution procedure 6 for receiving e-mails, and goes to a step SP51. In the step SP51, the e-mail receive portion 90 as the e-mail input means downloads the e-mail addressed thereto from the provider 12 according to the e-mail program, then goes to a next step SP52.

In the step SP52, the mail header information extract processing portion 91 as the mail character string extract means monitors the e-mail being downloaded via the e-mail receive portion 90 according to the receiving melody reproducing program and extracts only the mail header information from the e-mail, then goes to a next step SP53.

In the step SP53, the mail header information extract processing portion 91 reads out the domain name from the mail address of the mail sender in the mail header information, then goes to a next step SP54.

In the step SP54, the mail header information extract processing portion 91 determines if the domain name read out coincides with some preset specific domain name having been registered already in the hard disc.

If a negative result is obtained here, which means that this domain name read out coincides with none of the preset specific domain names registered in the hard disc, the mail header information extract processing portion 91 moves to a step SP61 to end its processing.

In contrast to the above, if an affirmative result is obtained in the step SP54, which means that the domain name read out coincides with some of the preset specific domain names registered in the hard disc, the mail header information extract processing portion 91 advances to a next step SP55.

In the step SP55, the mail header information extract processing portion 91 extracts a mail account from the mail address of the mail sender, then goes to a next step SP56.

In the step SP56, the mail header information extract-processing portion 91 determines if this mail account coincides with some preset specific mail account having been registered in the hard disc in advance.

If a negative result is obtained here, which means that this mail account coincides with none of the preset specific mail accounts registered in the hard disc, the mail header information extract processing portion 91 advances to the step SP61 to terminate its processing.

In contrast to the above, if an affirmative result is obtained in the step SP56, which means that the mail account extracted coincides with some preset specific mail account registered in the hard disc, the mail header information extract processing portion 91 goes to a next step SP57.

In the step SP57, the mail header information extract processing portion 91 retrieves a preset specific character string (for example, "HELLOW") having been registered in advance from a text of the e-mail which was downloaded by the e-mail receive portion 90, then goes to a next step SP58.

In the step SP58, the mail header information extract processing portion 91 determines if the preset specific character string having been registered in advance is found in the text of the e-mail.

If a negative result is obtained here, which means that the preset specific character string registered is not found in the text of the e-mail, the mail header information extract processing portion 91 goes to the step SP61 to terminate its processing.

In contrast to the above, if an affirmative result is obtained in the step SP58, which means that some preset specific character string registered in advance is found in the text of the e-mail, the mail header information extract processing portion 91 goes to a next step SP59.

In the step SP59, the mail header information extract processing portion 91 refers to a programmed processing correlation (lookup) table as shown in FIG. 20 to retrieve a music file corresponding to the preset specific character string, reads out this music file corresponding thereto from the hard disc in the HDD 68, and sends the same to the program processing portion 92, then goes to a next step SP60.

In the step SP60, the program processing portion 92 as the control means executes a processing to reproduce the music file using the sound chip so as to output to the speakers 27A, 27B, and at the same time, displays the music title display screen 120 on the liquid crystal display 28, then goes to the step SP61 to end its processing.

(2-7) Command Execution Procedure 7 When Receiving E-mails:

With reference to FIG. 21, the personal computer 16 enters from a routine RT7 to start a command execution procedure 7 for receiving an e-mail according to the invention, and goes to a step SP71. In the step SP71, the e-mail receive portion 90 as the e-mail input means downloads an e-mail addressed thereto from the provider 12 according to the e-mail program, then goes to a next step SP72.

In the step SP72, the mail header information extract processing portion 91 as the mail character string extract means monitors the e-mail being downloaded to the e-mail receive portion 90 according to the receiving melody reproducing program, and extracts only its mail header information from the e-mail being downloaded, then goes to a next step SP73.

In the step SP73, the mail header information extract processing portion 91 reads out a domain name from the mail address of the mail sender in the mail header information, then goes to a next step SP74.

In the step SP74, the mail header information extract processing portion 91 determines if the domain name read out coincides with some preset specific domain names registered in the hard disc in advance.

If a negative result is obtained here, which means that the domain name read out coincides with none of the preset specific domain names registered in the hard disc, the mail header information extract processing portion 91 advances to a step SP82 to terminate its processing.

In contrast to the above, if an affirmative result is obtained in the step SP74, which means that the domain name read out coincides with some preset specific domain name registered in the hard disc, the mail header information extract processing portion 91 goes to a next step SP75.

In the step SP75, the mail header information extract processing portion 91 extracts a mail account of the mail address, then goes to a next step SP76.

In the step SP76, the mail header information extract processing portion 91 determines if the mail account extracted coincides with any preset specific mail account registered in the hard disc in advance.

If a negative result is obtained here, which means that the mail account extracted coincides with none of the preset specific mail accounts registered in advance in the hard disc, the mail header information extract processing portion 91 goes to the step SP82 where to terminate its processing.

In contrast to the above, if an affirmative result is obtained in the step SP76, which means that this mail account coincides with the mail account having been registered already in the hard disc, the mail header information extract processing portion 91 goes to a next step SP77.

In the step SP77, the mail header information extract processing portion 91 refers to a detected character string correlation (lookup) table 160 shown in FIG. 22, then goes to a next step SP78.

In the step SP78, the mail header information extract processing portion 91 retrieves a specific character string (for example, "HELLOW") correlated with the mail account from the text of the e-mail downloaded via the e-mail receive portion 90 according to the detected character string correlation table 160, then goes to a next step SP79.

In the step SP79, the mail header information extract processing portion 91 determines if the specific character string correlated with the mail account is found in the text of the e-mail.

If a negative result is obtained here, which means that the specific character string correlated with the mail account is not found in the text of the e-mail, the mail header information extract processing portion 91 moves to the step SP82 to terminate its processing.

In contrast to the above, if an affirmative result is obtained in the step SP79, which means that the specific character string correlated with the mail account is found in the text of the e-mail, the mail header information extract processing portion 91 goes to a next step SP80.

In the step SP80, the mail header information extract processing portion 91 refers to the programmed processing correlation table 150 (FIG. 20) to retrieve a music file correlated with the specific character string extracted, reads out the correlated music file from the hard disc of the HDD 68, and sends it to the program processing portion 92, then moves to a next step SP81.

In the step SP81, the program processing portion 92 as the control means executes a processing to reproduce the music file to output from the speakers 27A, 27B, and at the same time, displays the music title display screen 120 on the liquid crystal display 28, then goes to the step SP82 to end the processing.

(3) Operations and Effects according to the Embodiments of the Invention:

According to the information processing system and the method of operations thereof described hereinabove, wherein the personal computer 16 on the side of the recipient of the e-mail enables extraction of the mail header information from the e-mail by its mail header information extract processing portion 91 during downloading of the e-mail addressed thereto via the e-mail receive portion 90, and execution of the preset processing (for example, reproducing of the music file corresponding to the preset specific mailing address) which is correlated with the preset specific mailing address of the mail sender contained in the mail header information and which is registered in advance in the hard disc, therefore, there has been accomplished such an advantage that the recipient of the e-mail is allowed to recognize easily who is the sender of the e-mail before he/she opens that e-mail actually because the preset melody correlated with and specified for each mailing address of the mail sender is reproduced from the speakers 27A, 27B upon receiving the e-mail.

Further, there is another advantage that the personal computer 16 on the side of the recipient is required only to install the receiving melody reproducing program and correlate the mail address of the e-mail sender with a preferred music file selectively on the setup screen 110 in order to be able to reproduce the melody specifically set up for each e-mail sender from the speakers 27A, 27B upon reception of the e-mail, thereby there is no need of forcing the personal computer 17 on the side of the e-mail sender to execute any specific operation other than the normal e-mail sending procedure, thereby relieving the sender of any additional burden.

Still further, there is another advantage that the personal computer 16 at the recipient side which is allowed to refer to the programmed processing correlation (lookup) tables 130, 140, 150 and 160 during its processing is required only to add a new item to the programmed processing correlation table or update old ones in order to be able to change the registered mail addresses, character strings and processing contents easily without the need of replacing all the installed receiving melody reproducing program itself, thereby significantly improving its extensibility.

According to the arrangement described above, the personal computer 16 at the recipient side is enabled to execute the predetermined processing which is correlated with the specific character string which is contained in the e-mail at the time of downloading the e-mail addressed to the recipient, thereby allowing for the user to recognize who is the sender of the e-mail simultaneously at the time of downloading of the e-mail, and/or to be informed of various information capable of recognizing the importance, priority or the like of the e-mail.

Still further, according to the invention, there are such advantages that a specific mail address name@xxx.vaio.ne.jp (where "name" and "xxx" are arbitrary) containing a specific domain name "vaio.ne.jp" can be obtained by subscribing to a network service using a specific URL (Uniform Resource Locator), for example, such as http://www.vaio.ne.jp/ accessible on the internet, then the receiving melody reproducing program preset as described above is installed in each personal computer of each user for reproducing the specific melody correlated with the specific domain name ("vaio.ne.jp") such that the specific melody is reproduced only when e-mails are exchanged between subscriber members who have a mail address containing the specific domain name "vio.ne.jp" thereby promoting a sense of unity and partnership to grow among the subscriber members sharing the same domain name.

In this instance, it is also possible to allow for some particular melody to be reproduced in order to notify the user client of some particular events or various campaigns on e-mails using the mailing address of the sender supplied from a particular contents service provider 18.

A provision of a link operation of the receiving melody reproducing program described above to a network service for granting the mailing address containing the specific domain name "vaio.nejp" will provide an added value to this mail address which contains the domain name of "vaio.n-e.jp" such as name@xxx.vaio.ne.jp. Thereby, a new business model on the internet incorporating a completely new revenue structure can be envisaged such as a mail address granting service for granting the mail address with the added value described above with a high expectancy of an increased profit as a compensation for such services.

By way of example, the mail address granting service described above to which the user can subscribe from the aforementioned URL (http:///www.vaio.ne.jp/) can be also subscribed to via the current provider with whom the user client has a contract, and even if the user changes the provider at any time, there is no need to change his/her mail address.

(4) Other Preferred Embodiments of the Invention:

The preferred embodiments of the invention set forth hereinabove have been described by way of example of such cases where the receiving melody reproducing program is downloaded via the internet 11 from the provider 12 to the hard disc of HDD 68 at the user client to install thereon, however, the present invention is not limited thereto, and the receiving melody reproducing program may be provided as stored in a package medium such as a CD-ROM (Compact Disc-Read Only Memory), a DVD (Digital Versatile Disc) ROM from which the melody reproducing program for notifying reception of the e-mail is read out and installed as required, or the same may be provided in a program storage medium such as a semiconductor memory or a magnetic disc as stored temporarily or permanently therein to be installed and reproduced as required.

Further, as other means to store the receiving melody reproducing program in these program storage media, wired or radio communication media such as a local area network, digital satellite communication broadcasting or the like may be utilized, or various types of communication interfaces such as routers, modems or the like may be interposed prior to installing the same.

Still further, in the preferred embodiments of the invention described hereinabove, it is explained by way of example of such cases in which the preset processing (the music file reproducing processing) to be executed is correlated with the particular mail address of the sender in the mail header information within the e-mail downloaded from the provider 12 (i.e., the portion of "From: ukemero@test.abcd.so.jp"), however, the present invention is not limited thereto, and it may be arranged such that the above-mentioned preset processing to reproduce the music file is correlated with a character string of a subject title ("Sbuject:-----") in the mail header information within the e-mail.

Furthermore, in the preferred embodiments of the invention set forth above, it is described that the preset processing (to reproduce the correlated music file) is executed upon authentication of the mail account after verification of the domain name in the mail address, and only when this domain name and this mail account coincide with those having been registered in advance. However, the present invention is not limited thereto, and it may be arranged also such that the preset processing correlated therewith is executed only if the mail account coincides with the preset specific mail account having been registered in advance.

Still more, in the preferred embodiments of the invention described hereinabove, it is explained by way of example of such cases in which the preset processing (to reproduce the correlated music file) which is correlated with the respective mail address and/or character string in the text and is registered in advance is executed in reference to the programmed processing correlation tables 130, 140 and 150, however, the present invention is not limited thereto, and it may be arranged also such that a preset picture file (for example, a facial motion or still pictures of the sender) having been registered in advance may be displayed, or that a receiving time processing program which contains a programmed processing correlation table 170 as shown in FIG. 23 is downloaded from the web server 84 of the provider 12 to be installed in the personal computer 16, then a predetermined command processing having been preset in advance is executed with respect to a mail account of the e-mail sender transferred from the web server 84.

In this case, the provider 12 on the side of the sender is not required to add any special data or to execute any special manipulation when transferring the e-mail but to use only a predetermined mailing address (mail account) correlated in the programmed processing correlation table 170 in order to enable the personal computer 16 to execute any intended programmed processing.

Namely, by transmitting an e-mail using the preset specific mail address to the personal computer 16 which has installed the receiving time processing program, the provider 12 on the side of the sender is ensured to enable the personal computer 16 to activate the browser to open its web page corresponding to a particular argument, to reproduce and output an audio file corresponding to the argument, to open a popup window so as to display contents of a file corresponding to the particular argument, and still further to shut down the power by a remote control.

Still further, in the description of the preferred embodiments of the invention set forth hereinabove, the present invention has been described by way of example as applied to the personal computer 16 for use in the information processing system, however, the present invention is not limited thereto, and it may be applied also to various other information processing systems having a terminal capable of downloading e-mails including a portable telephone, a PDA (Personal Digital Assistants) or the like.

As described hereinabove, according to the present invention, there has been provided the method of automatically executing the predetermined processing set up in advance when downloading the e-mail addressed to the recipient client from the server, the method thereof comprising the steps of: downloading the e-mail addressed to the recipient client; extracting the predetermined character string contained in the e-mail downloaded; and executing the predetermined processing correlated in is advance with the predetermined character string having been extracted.

What is claimed is:

1. An information processing system comprising:
   receiving means for receiving an electronic mail containing electronic mail sender information and a mail text;
   first determining means for determining whether said electronic mail sender information corresponds to a specific registered mail account;
   reading means for reading a lookup table including a plurality of preset character strings and a corresponding plurality of music files if said electronic mail sender information corresponds to said specific registered mail account;
   second determining means for determining if at least one of said plurality of preset character strings is included in said mail text;
   retrieving means for retrieving a music file corresponding to said at least one preset character string determined to be included in said mail text; and
   means, when the electronic mail has been received, for causing the retrieved music file to be reproduced and for causing a signal to be supplied to a display means representative of the respective title and artist such that the retrieved music file is reproduced simultaneously or substantially simultaneously with the display of the respective title and artist on a screen of said display means.

2. The information processing system as claimed in claim 1, wherein said lookup table is set up in advance.

3. The information processing system of claim 1, wherein the respective music file includes a picture file associated with the respective artist, and wherein the causing means causes the picture file to be displayed on said display means when the electronic mail has been received.

4. An information processing method comprising the steps of:
   receiving an electronic mail containing electronic mail sender information and a mail text;
   determining whether said electronic mail sender information corresponds to a specific registered mail account;
   reading a lookup table including a plurality of preset character strings and a corresponding plurality of music files if said electronic mail sender information corresponds to said specific registered mail account;
   determining if at least one of said plurality of preset character strings is included in said mail text;
   retrieving a music file corresponding to said at least one preset character string determined to be included in said mail text; and
   causing, when the electronic mail has been received, the retrieved music file to be reproduced and causing a signal to be supplied to a display means representative of the respective title and artist such that the retrieved music file is reproduced simultaneously or substantially simultaneously with the display of the respective title and artist on a screen of said display means.

5. The information processing method as claimed in claim 4, wherein said lookup table is set up in advance.

6. The information processing method of claim 4, wherein the respective music file includes a picture file associated with the respective artist, and wherein the causing step causes the picture file to be displayed on said display means when the electronic mail has been received.

* * * * *